(12) United States Patent
Nishihara

(10) Patent No.: US 6,512,616 B1
(45) Date of Patent: Jan. 28, 2003

(54) OPTICAL PACKET SWITCH

(75) Inventor: Motoo Nishihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/447,580

(22) Filed: Nov. 23, 1999

(30) Foreign Application Priority Data

Nov. 30, 1998 (JP) ............................................ 10-339461

(51) Int. Cl.[7] ................................................ H04J 14/08
(52) U.S. Cl. ...................... 359/135; 359/128; 359/135; 359/139; 370/528
(58) Field of Search ................................ 359/128, 135, 359/139; 370/528

(56) References Cited

U.S. PATENT DOCUMENTS

| | | | | |
|---|---|---|---|---|
| 4,084,254 A | * | 4/1978 | Birney et al. | 708/655 |
| 5,872,530 A | * | 2/1999 | Domyo et al. | 341/106 |
| 6,005,902 A | * | 12/1999 | Bortolini et al. | 359/115 |
| 6,359,873 B1 | * | 3/2002 | Kobayashi | 370/311 |

FOREIGN PATENT DOCUMENTS

JP 6-232897 8/1994
JP 10-123577 5/1998

* cited by examiner

*Primary Examiner*—Leslie Pascal
*Assistant Examiner*—Dzung Tran
(74) *Attorney, Agent, or Firm*—Sughrue Mion, PLLC

(57) ABSTRACT

An optical packet switch uses electric circuits to implement input and output sections of an optical switch that performs packet switching. Retiming of packet data in the output section is facilitated to reduce the scale of the circuitry. In the input section a packet-data signal and a clock signal for retiming the packet data are wavelength multiplexed by a wavelength multiplexer and transferred over the same optical waveguide of the optical switch. In the output section the packet-data signal and the clock signal, which have been transferred from the same optical waveguide in the packet switch, are demultiplexed by a wavelength demultiplexer, and retiming of the packet-data signal is performed by an intra-device frame terminating unit. A frame format comprises, in addition to a flag pattern and a data field, a preamble and dummy data at the beginning and end thereof, respectively, for accommodating skew caused by transfer through the optical switch as well as a period of signal instability produced by switching of the optical switch. The packet data is transferred upon being placed in the data field of the frame format.

13 Claims, 10 Drawing Sheets

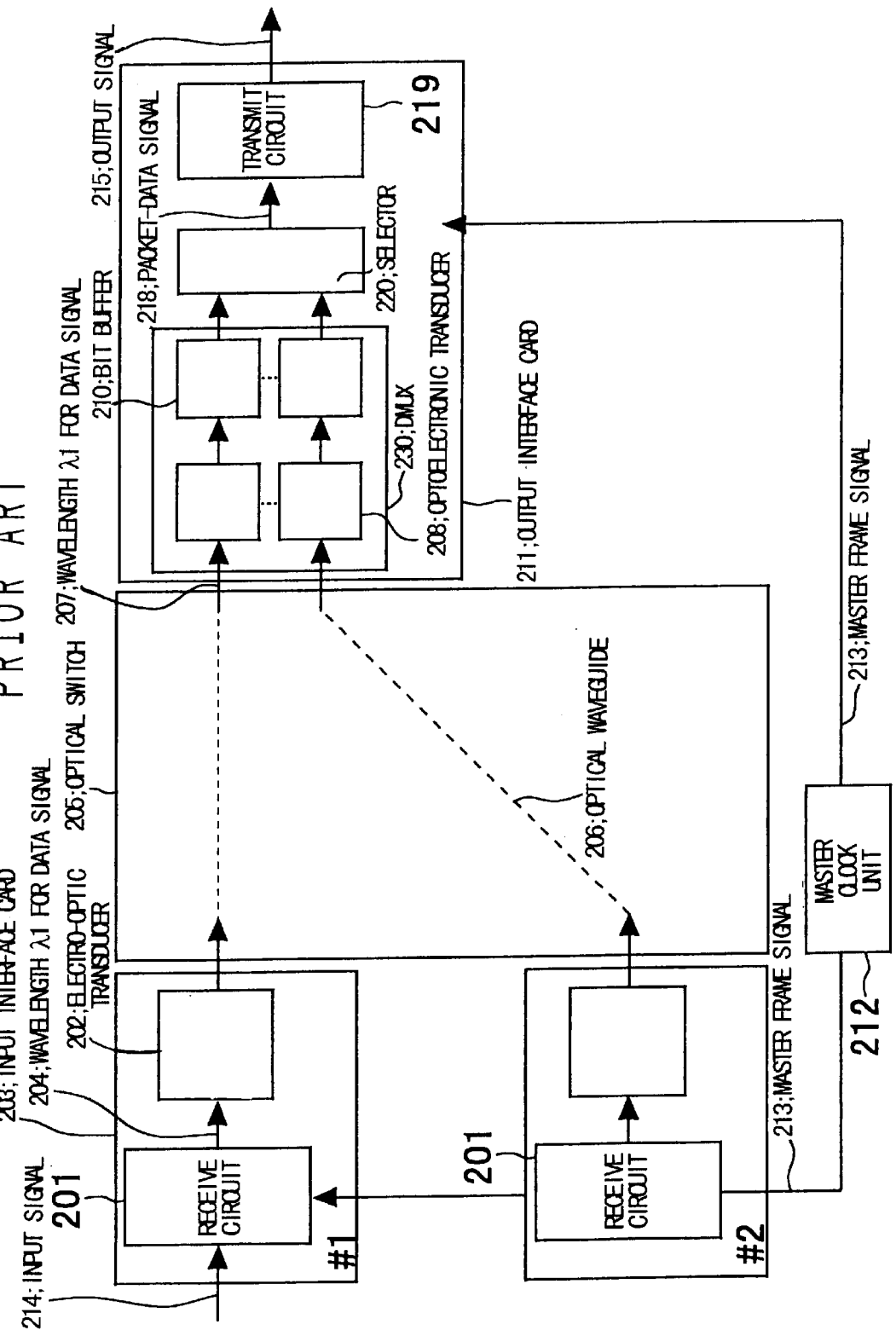

OPTICAL PACKET SWITCH

FIELD OF THE INVENTION

This invention relates to an optical packet switch (or switching system) for switching individual packets using an optical switch. More particularly, the invention relates to an optical packet switch in which, without using sophisticated clock synchronizing technology, it is possible to deal with a variation in frame phase due to factors such as skew in an optical switch, thereby making it possible to achieve accurate retiming.

BACKGROUND OF THE INVENTION

Techniques for constructing large-scale packet switches using optical switches are known in the art. However, it is very difficult to perform routing within the switch by referring to packet headers using optical elements alone and to achieve a packet memory using optical elements. For these reasons, packet switches are constructed by combining optical elements with electric circuits. In such a packet switch, the packet switching function is performed by an optical switch and the input/output units of the optical switch are implemented by electric circuits. In an optical switch of the waveguide type, the optical circuit of an optical directional coupler is formed on a substrate made of a GaAs- or InP-compound semiconductor or of a strongly dielectric material such as LiNb03, and the optical path is switched by changing the state of optical coupling by voltage applied to electrodes provided on two closely adjacent optical waveguides. Such an optical switch is capable of high-speed switching on the nanosecond order, by way of example.

FIGS. 8 to 10 are diagrams each illustrating the general structure of an optical packet switch according to the prior art. Each of these optical packet switches employs input and output interface cards composed of electric circuits and an optical switch constituted by optical elements.

For an understanding of the structures of the devices shown in FIGS. 8 to 10, refer to the specifications of Japanese Patent KOKAI Publications JP-A-10-123577 and JP-A-6-232897, by way of example.

In the optical packet switch shown in FIG. 8, a signal transferred on an optical waveguide 206 selected within an optical switch 205 is a packet-data signal only; no clock signal is transferred. An output interface card 211 has an optoelectronic transducer 208 by which the arriving optical signal transferred through the optical switch 205 is converted to an electric signal, a bit buffer 210 of a transfer terminating circuit 209 in which the electric signal is stored temporarily and read out subsequently as a packet-data signal, and a transmit circuit 219 for outputting a packet-data signal 215 that has thus been retimed.

A problem with the arrangement of this device, however, is how the packet-data signal will be terminated by the clock within the packet of the output interface card 211. Specifically, with the device shown in FIG. 8, a master clock unit 212 within the device distributes a master frame signal 213 to various components in the device (in FIG. 8, to a receive circuit 201 in an input interface card 203 and to the transfer terminating circuit 209 in the output interface card 211). The output interface card 211 performs retiming by generating a clock synchronized to the master frame signal 213 and reading the packet-data signal, which is transferred from the optical switch 205, out of the bit buffer 210 in response to the generated clock.

If the packet-data signal is a high-speed signal whose frequency is on the gigahertz order or greater, the packet-data signal that enters the output interface card 211 via the optical switch 205 will experience a signal delay or skew that differs depending upon which input interface card it has been transferred from, i.e., depending upon the signal path. It is extremely difficult to define and produce an intra-package clock signal that is capable of being received uniformly by the output interface card 211 regardless of the particular skew. As a result, there is no alternative but to adjust timing by a highly precise adjustment within the device.

In the device illustrated in FIG. 9, a burst-receiving PLL (Phase-Locked Loop) circuit 230 regenerates a receive clock signal 217 from the packet-data signal that has been regenerated by the output interface card 211. The burst-receiving PLL circuit 230, the input to which is an output signal of an optoelectronic transducer 208, extracts timing information from the packet data (which is a burst signal) on a packet-by-packet basis and generates the receive clock signal 217 by which the packet-data acceptance timing in the bit buffer 210 is controlled. As a result, the packet-data signal in the output interface card 211 is retimed so that the packets can be accepted.

A problem with the device depicted in FIG. 9 is that, in the first place, implementing the burst-receiving PLL circuit 230 is difficult. It is particularly difficult to construct a burst-receiving PLL circuit that extracts a clock dynamically packet by packet at high speed on the gigahertz order or greater. Even if such as PLL circuit can be realized it would require too much time to extract the clock. As a consequence, it is impossible to extract a clock and accept data while following up packet transfer on the order of several microseconds or less.

The device shown in FIG. 10 seeks to avoid the above-described clock adjustment in the output interface card 211. To accomplish this, wavelengths from a plurality of input interface cards 203 are allocated regularly to all output interface cards 211 and optical signals having these wavelengths are always passed through the optical switch 205. The output interface card 211 electrically terminates the optical signal of each wavelength from each of the input interface cards 203 and extracts the clock. In other words, a signal always flows on a transfer path from a certain input interface card 203 to the output interface card 211, and the output interface card 211 performs constant clock extraction individually from signals that are transferred from all of the plurality of input interface cards 203. This solves the above-mentioned problem associated with dynamic clock extraction and makes it possible to implement arbitrary packet transfer.

Specifically, each output interface card 211 is provided with a receive circuit (DMUX) 230 comprising a plurality of optoelectronic transducers 208 and bit buffers 210 corresponding to respective ones of the plurality of input interface cards (#1 to #N, where N=2 in FIG. 10) 203, and with a selector 220 for selecting any one of the outputs of the DMUX 230. The wavelengths of the optical signals that are transmitted over the optical waveguides 206 of the optical switch 205 differ for each input interface. In comparison with the arrangement shown in FIG. 8, the scale of the electrical receiving circuitry in the output interface card 211 is increased by a factor equivalent to the number (N) of input interface cards, and the scale of the electrical circuitry of the overall device also is increased by a factor of N. This increases the size of the device and raises the cost thereof. In addition, the number of wavelengths of the optical signals transmitted through the optical switch 205 also is N times the number of wavelengths in the arrangements shown in FIGS. 8 and 9. The result is an increase in the size and cost of the optical switch 205.

SUMMARY OF THE DISCLOSURE

Thus, the devices according to the prior art give rise to the following problems:

The first problem is that the device shown in FIG. 8 is disadvantageous in that it is difficult for the output interface card 211 to retime packet-data signals that are transferred from different input interface cards. The reason for this is that since signal delay or skew is produced that differs depending upon the input interface cards for different sources of transmission, intra-package clock information capable of being received indiscriminately regardless of the particular skew is difficult to be extracted from the master frame signal.

There is the second problem as follows. With the device shown in FIG. 9, the receive clock signal 217 is regenerated from a packet-data signal 216 by the burst-receiving PLL circuit 230 in the output interface card 211 and the burst-receiving PLL circuit 230 extracts timing information from the packet-data signal 216 packet by packet and generates the clock. The retiming of the packet-data signal 216 is performed by the clock and the packet is accepted. However, difficulty is encountered in the very act of constructing the burst-receiving PLL circuit 230 that extracts the clock dynamically packet by packet at high speeds at an operating frequency on the gigahertz order or greater. Extracting the clock would take too much time even if such a PLL circuit could be constructed, and it would be impossible to extract a clock and accept data while following up packet transfer on the order of several microseconds or less. This is the second problem with the prior art.

There is the third problem as follows. The problem with the device shown in FIG. 10 is that the output interface card 211 is provided with the electrical receiving circuitry for supporting all of the input interface cards 203. In comparison with the arrangements shown in FIGS. 8 and 9, the scale of the electrical receiving circuitry in the output interface card is increased by a factor equivalent to the number (N) of input interface cards and the scale of the electrical circuitry of the overall device also is increased by a factor of N. This results in a much larger device and in higher cost. Furthermore, the number of wavelengths of the optical signals transmitted through the optical switch also is N times the number of wavelengths in the arrangements shown in FIGS. 8 and 9. The result is an increase in the size and cost of the optical switch.

In a packet switch, the relationship between data and retiming clock control information is uniquely determined in each circuit block that resides along the data transfer path within the device. Accordingly, the master clock unit within the device transfers a reference clock to each of the other blocks. By retiming the data in each of the circuit blocks in accordance with a clock phase shifted a fixed length from the reference clock, packets can be sent and received correctly.

However, in a case where an optical switch is used as the switch in the device, as in the devices of the prior art described above, skew within the optical switch gives rise to difficulties. Specifically, whenever an input port for the source of a packet transmission is switched by the switching action of the optical switch, the clock information necessary for retiming of the packet data changes at the output port owing to skew. Consequently, it is impossible to send and receive packets merely by stipulating the unified clock from the master clock unit.

The purpose of a packet switch using an optical switch originally is to realize a high-capacity packet switching performance. Individual transfer speeds are made very high. Skew produced within the optical switch amounts to several bits or more, for example, the result of which is a large fluctuation not only in bit phase (the bit phase undergoes a timing adjustment by retiming) but also in frame phase. This makes retiming of data extremely difficult.

According to Japanese Patent Kokai Publication JP-A-1-238248 (U.S. Pat. No. 2,595,025), there is the following disclosure relating to a high-speed packet switch using an optical switch, a clock signal and packet data are wavelength multiplexed and then transferred using the same path through the optical switch. On the output side of the optical switch the wavelengths are demultiplexed, the packet data and clock are converted to electric signals and the packet data is retimed by being variably delayed and then input to a flip-flop using the clock. As a result, even there is a delay between input and output owing to switching of the optical switch connection, retiming of the packet data is performed at an optimum timing. However, with the technique disclosed in the above-mentioned publication, no consideration is given to skew and to periods of signal instability etc. when the optical switch is switched. As mentioned above, skew produced in the optical switch is several bits or greater. Consequently, it is not possible to solve the problem of large fluctuation not only in bit phase but also in frame phase. As a result, this packet switch is not suitable for practical applications. As aforementioned, there is much to be desired in the optical packet switch (or switching system/method).

Accordingly, an object of the present invention is to provide a packet switch in which electrical circuits are used to implement the input and output sections of an optical switch that performs packet switching, wherein the retiming of packet data in the output section is facilitated and an increase in the scale of the circuitry is suppressed.

Another object of the present invention is to provide an optical switch that makes it possible to perform retiming at high speed regardless of a fluctuation not only in bit phase but also in frame phase caused by skew produced in an optical switch by transfer. Further objects of the present invention will become apparent from the entire disclosure including the claims and drawings.

Generally, the following concept underlies the present invention. In accordance with the present invention, clock information for the purpose of retiming on the output side is transferred, together with a packet-data signal, in the form of an optical signal when the packet-data signal is transferred through an optical switch. The packet data is placed in an intra-device frame, which has a preamble of a predetermined length and dummy data, taking into account skew of the optical switch and a period of signal instability when switching is performed. Intra-device packets and the clock information for retiming are multiplexed and transferred on the same path through the optical switch. On the output side the intra-device packet data and the clock information are demultiplexed from the received signal, the starting position of the packet data in an intra-device packet is sensed, and writing of the data in memory is performed from this point onward, thereby achieving retiming.

Specifically according to an aspect of the present invention, there is provided an optical packet switch having an input unit and an optical switch, wherein the input unit multiplex a control signal with packet data, which is to be transferred to a destination output unit via the optical switch, and sends the multiplexed packet data and control signal to the optical switch, the control signal being for the purpose of retiming the packet data at the destination output unit that receives the packet data;

the input unit generating an intra-device frame signal comprising a format having dummy-bit strings of predetermined lengths, which take into consideration switching timing of the optical switch and skew produced by transfer of the packet data through the optical switch, provided at the beginning and end, respectively, of the frame, and placing the packet data in a data storage area of the intra-device frame signal to thereby transfer the packet data to the destination output unit via the optical switch.

According to a second aspect of the present invention, there is provided an optical packet switch having an input unit and an output unit of an optical switch which performs packet switching, the input and output units each comprising an electric circuit;

where in the input un it has a frame signal generator of an intra-device frame signal having a format comprising a preamble, dummy data and input packet data interposed between the preamble and the dummy data, the preamble and the dummy data having lengths, the intra-device frame signal generator being designed to accommodate a period of signal instability produced when switching is performed by the optical switch as well as skew caused by transferring the packet data through the optical switch, and for append a retiming control signal, which is for controlling retiming of the packet data at the output unit, to the intra-device frame signal and then sending the intra-device frame signal to an optical transmission path of the optical switch; and wherein the output unit is designed to multiplex optical signals, which have been transferred from the optical switch, into the intra-device frame signal and retiming control signal, retime the demultiplexed intra-device frame signal by the demultiplexed retiming control signal and outputting the packet data extracted from the intra-device frame signal upon handing the intra-device frame signal over to an output clock signal. The output unit may be designed to sense a starting position of the packet data using the retiming control signal, write the packet data, from this starting position to an end position, to a storage device using the demultiplexed timing control signal as a write control signal, and to read the packet data out of the storage device using the output control signal as a read-out signal.

According to a third aspect of the present invention, there is provided an optical packet switch having an input unit, an optical switch which performs packet switching and an output unit thereof, the input and output units each comprising an electric circuit, wherein retiming control information, which is for retiming packet data in the output unit, is transferred in the form of an optical signal from the input unit to the output unit through the optical switch;

the input unit including:
a packet data receiver designed to receive the packet data from a transmission line and generating an intra-device frame by placing the packet data in a data field of an intra-device frame having a frame format comprising a preamble having a length that accommodates skew produced by transfer of the packet data through the optical switch, a flag pattern for sensing starting position of the data field, the data field, and dummy data having a length at least equal to switching time of the optical switch; and a wavelength multiplexer designed to wavelenght-multiplex a retiming control signal, which is for retiming the packet data in the output unit, with the intra-device frame that has been generated, an d sending the wavelength-multiplexed intra-device frame signal and packet data to an optical transmission path of the optical switch;

the output unit being designed to demultiplex optical signals, which have been transferred from the optical switch, into the intra-device frame signal and retiming control signal, sense starting position of the packet data by sensing the flag pattern in the intra-device frame signal, write the packet data from the starting position to storage means using the separated retiming control signal as sa write control signal, read the packet data out of the storage means based upon a read-out timing control signal, and output the packet data to a transmission line via a transmit circuit.

According to a fourth aspect of the present invention, there is provided an optical packet switch having an input unit, an optical switch which performs packet switching and an output unit thereof, the input and output units each comprising an electric circuit;

the input unit including:
means for receiving data at a transmission-line input and extracting a receive clock signal and a receive packet-data signal;
means for changing over from the receive clock signal to a first clock signal synchronized to a master frame signal that stipulates length of a reference frame period within the optical packet switch, achieving retiming using the first clock signal, and generating an intra-device frame signal having a frame format comprising a preamble and dummy data each of predetermined lengths, with the packet data being interposed between the preamble and the dummy data; and
means for converting the intra-device frame signal and the first clock signal to mutually different optical wavelengths, wavelength multiplexing the wavelength of the intra-device frame signal and the wavelength of the clock signal and transferring the wavelength multiplexed signals to the optical switch;

the optical switch transferring the wavelength of the intra-device frame signal and the wavelength of the first clock signal over an identical path;

the output unit including:
means for demultiplexing the wavelength of the intra-device frame signal and the wavelength of the clock signal transferred from the optical switch, converting these wavelengths to respective ones of electric signals, and outputting the electric signals as an intra-device frame signal and a second clock;
means for receiving the intra-device frame signal by performing retiming using the second clock signal, changing over from the second clock signal to a third clock signal synchronized to the master clock signal, and extracting a packet-data signal from the intra-device frame signal; and
means for outputting the extracted packet data to a transmission line.

The intra-device frame may include, starting from a leading edge thereof, a preamble having enough length to accommodate skew that accompanies transfer of packet data through the optical switch, a flag pattern of a predetermined length, a data field, and dummy data having a length conforming to switching time of the optical switch;

the input unit placing the packet data in the data field to thereby transfer the packet data to the output unit via the optical switch.

According to a fifth aspect of the present invention, there is provided an optical packet switch having an optical switch which performs packet switching, an input unit and an output unit, a master frame signal, which specifies length of a reference frame period within the optical packet switch, being input to the optical switch, the input unit and the output unit, the optical switch switching a connection between the input and output units based upon the master frame signal;

(a) the input unit including:
- (a1) means for extracting packet data from a signal input from a transmission line, bit synchronizing the packet data to a first clock signal generated using the master frame signal as a reference, and generating a fixed-length intra-device frame signal having a frame format comprising a preamble having enough length to accommodate signal skew that is caused by transfer of the signal through the optical switch, a flag pattern for sensing starting position of a data field, a data field containing the packet data, and dummy data having a length at least equal to switching time of the optical switch; and
- (a2) wavelength multiplexing means for wavelength multiplexing a wavelength of an intra-device frame signal and a wavelength of a clock signal obtained by converting the first-mentioned intra-device frame signal and the first clock, respectively, to optical signals having mutually different wavelengths, and sending the optical signals of the multiplexed wavelengths to the optical switch;

(b) the output unit including:
- (b1) means for wavelength demultiplexing, by wavelength demultiplexing means, the optical signals constituted by the wavelength-multiplexed wavelength of the intra-device frame signal and wavelength of the clock signal transmitted through the optical switch, converting these two demultiplexed optical signals to electric signals and outputting them as an intra-device frame signal and a second clock signal, respectively;
- (b2) means for sensing starting position of the data field by sensing the flag pattern in the intra-device frame signal, and performing control in such a manner that the packet data contained in the data field is written to a storage device in sync with the demultiplexed second clock signal; and
- (b3) means for reading the packet data out of the storage means in response to a third clock synchronized to the master frame signal and outputting the packet data to a transmit circuit in order to output the packet data to a transmission line.

According to a sixth aspect of the present invention, there is provided an optical packet switch having an optical switch which performs packet switching, an input unit and an output unit, a master frame signal, which specifies length of a reference frame period within the optical packet switch, being output from master frame generating means and input to the optical switch, the input unit and the output unit, the optical switch switching a connection between the input and output units based upon the master frame signal;

(a) the input unit including:
- (a1) an input signal receiver designed to for receive an input signal from a transmission line, extracting packet data in a payload of a frame, to bit-synchronize the extracted payload data to a first clock signal generated using the master frame signal as a reference, to generate and output an intra-device frame signal having a preamble having a predetermined length, a flag pattern, a data field following the flag pattern and containing the packet data, and a dummy pattern, and to output the first clock signal;
- (a2) first and second electro-optic transducers converting the intra-device frame signal and the first clock signal, which are input thereto, to an optical signal having a wavelength of an intra-device frame signal and an optical signal having a wavelength of a clock signal, and outputting the optical signals, the wavelengths being different from each other; and
- (a3) a wavelength multiplexer, to which are input the wavelength of the intra-device frame signal and the wavelength of the clock signal constituting the optical signals output from respective ones of the first and second electro-optic transducers, designed to wavelenght-multiplex these wavelengths and output them to the optical switch;

(b) the output unit including:
- (b1) a wavelength demultiplexer, to which the optical signals from an optical transmission path of the optical switch are input, for wavelength demultiplexing these optical signals to the wavelength of the intra-device frame signal and the wavelength of the clock signal;
- (b2) first and second optoelectronic transducers, to which the wavelength of the intra-device frame signal and the wavelength of the clock signal demultiplexed and output by the wavelength demultiplexer are respectively input, for converting the same to an electric intra-device frame signal and an electric second clock signal, respectively;
- (b3) an intra-device frame terminator having:
  - (b3-1) means for receiving the intra-device frame signal and the second clock signal respectively output from the first and second optoelectronic transducers, and sensing starting position of the data field by sensing a match with the flag pattern from the intra-device frame in sync with the second clock signal;
  - (b3-2) means for performing control in such a manner that when the starting position of the data field is sensed from the intra-device frame signal, the packet data from the starting position of the data field to an end position thereof is written to a memory in sync with the second clock signal, the second clock signal serving as a write signal; and
  - (b3-3) means for reading the packet data out of the memory in sync with a third clock generated using the master frame signal as a reference, the third clock serving as a read-out signal; and (c) transmit means for transmitting the packet data from the intra-device frame terminator.

The intra-device frame terminator may include:

flag pattern sensing means for sensing the flag pattern of the intra-device frame signal;

memory means for storing the pattern data temporarily;

write control means, responsive to a signal from the flag pattern sensing means indicating that the flag pattern has been sensed, for applying a write-enable signal to the memory means, wherein the packet data in the data field following the flag pattern in the intra-device frame signal is written to the memory means in sync with the second clock signal;

read-out control means, responsive to a read-out start signal output from the write control means after a predetermined number of bits have been written to the memory means, for applying a read-out-enable signal to the memory means, whereby timing of start of read-out from the memory means is control led so that read-out is performed a predetermined number of bits after writing of the packet data to the memory means has started;

the packet data being read of the memory means in sync with the third clock signal;

clock synchronizing means, to which the master frame signal is input, for generating the third clock in sync with the master frame signal; and phase control means for controlling operation start timing of the flag-pattern sensing means, the write control means and the read-out control means based upon the third clock signal from the clock synchronizing means.

The phase control means may receive the third clock signal, outputs first and second operation start signals, which are for enabling start of operation of the flag-pattern sensing means and write control means, respectively, at predetermined timings before start of the flag pattern and start of data field, respectively, of the intra-device frame signal, and output a third operation start signal, which is for enabling start of operation of the read-out control means, at a predetermined timing after output of the first and second operation start signals but before start of the data field.

The write control means deactivates the write-enable signal, which is supplied to the memory means, during the interval of the dummy data in the intra-device frame signal.

In a further aspect of the present invention, the optical packet switch comprises a plurality of the input units, a plurality of the output units, the optical switch, packet scheduler means and master clock generating means;

each of the input units first sending a request signal to the packet scheduler means when packet data is transferred to a destination output unit through the optical switch;

the packet scheduler means deciding, on the basis of the request signal from each input unit, an input unit and an output unit that are allowed to perform a transfer, sending an enable signal to the input unit that has been allowed to perform a transfer, sending an enable signal to the output unit that has been allowed to perform a transfer, and sending a switch setting signal to the optical switch;

the packet switch connecting an optical waveguide between the decided input unit and the output unit by the switch setting signal from the packet scheduler means; and the master clock generating means supplying the input unit, the output unit and the packet scheduler means a master clock signal for specifying a frame period.

PREFERRED EMBODIMENTS

In a preferred embodiment of the present invention, an optical packet switch uses electric circuits to implement input and output sections of an optical switch that performs packet switching, wherein retiming control information, which is for retiming packet data in the output section, is transferred together with the packet-data signal in the form of an optical signal from the input section to the output section over the same path through the optical switch.

The clock signal constituting the retiming control information for achieving retiming in the output section preferably is wavelength multiplexed with the packet-data signal and transferred over the selected path through the optical switch. As a result, it is possible to minimize a difference in delay between the two signals. The packet-data signal is retimed in the output section based upon the clock information that has been transferred through the optical switch.

In a preferred embodiment of the present invent ion, the optical packet switch includes an input section of an optical switch, the input section having means for generating an intra-device frame signal having a frame format composed of a preamble, which has a predetermined length greater than skew caused by transferring input packet data through an optical switch and a period of signal instability produced when switching is performed by the optical switch, a flag pattern following the preamble, dummy data at the end and the packet data interposed between the flag pattern and the dummy data. A retiming control signal for retiming the packet data in the output section is multiplexed onto the generated intra-device frame signal and transmitted on the same optical transmission path through the optical switch.

In a preferred embodiment of the present invention, the output section of the optical packet switch demultiplexes (i.e., separates) the intra-device frame signal and retiming control signal from the optical signals that have been transferred from the optical switch, senses the starting position of the packet data with regard to the intra-device frame signal, writes the packet data to storage means (memory) from this starting position using the demultiplexed retiming control signal as a write control signal, reads the packet data out of the storage means based upon a read-out timing control signal and outputs the packet data over a transmit circuit.

In the present invention, an intra-device frame (see FIG. 5) for packet transfer through the optical switch is newly defined to simplify packet processing in the output section after retiming of the packet-data signal and to assure the timing precision of the retiming operation. The intra-device frame signal is newly defined for the purpose of transfer through the input section, optical switch and output section and the length thereof is decided by the master frame signal, which determines the length of the reference frame period within the optical packet switch. The intra-device frame signal comprises a preamble, a flag pattern, a data field and dummy data.

The preamble at the beginning of the intra-device frame is designed to have a length that takes into account the period of signal instability produced at switching of the optical switch as well as maximum skew produced by transfer through the optical switch. The dummy data at the tail end of the frame is decided taking into consideration the switching time of the optical switch or the difference between write and read timings of a bit buffer designed to retime. The flag pattern is for sensing the starting position of the data field. The latter contains the packet data. In the input section the intra-device frame signal is bit-synchronized to the lock signal produced using the master frame signal as a reference, and the intra-device frame signal is transferred to the output section, together with the clock signal, through the optical switch. The packet data is extracted and then transmitted to the transmission line upon being retimed in the output section.

In accordance with the present invention constructed as set forth above, it is possible to construct an optical packet switch, which uses an optical switch, that achieves packet transfer at a speed much higher in comparison with the prior art. It is unnecessary for the output section to be provided with a circuit for generating clock information in dependence upon packet data transferred to the output section. Furthermore, in regard to working the present invention, the optical switch need not be provided with additional functions; it is possible for an existing optical switch to be used as is.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a diagram showing the structure of an optical packet switch according to still another example of the prior art.

DETAILED DESCRIPTION OF THE PREFERRED EMBODIMENTS OF THE INVENTION

A mode of carrying out the present invention will be described with reference to FIG. 4, which illustrates the overall system configuration. The system includes a plurality of input interface cards (#1–#N) 130, an optical switch 131, a plurality of output interface cards (#1–#N) 132, a master clock unit 134 for generating and outputting a master frame signal, and a packet scheduler 133.

Figure 1:
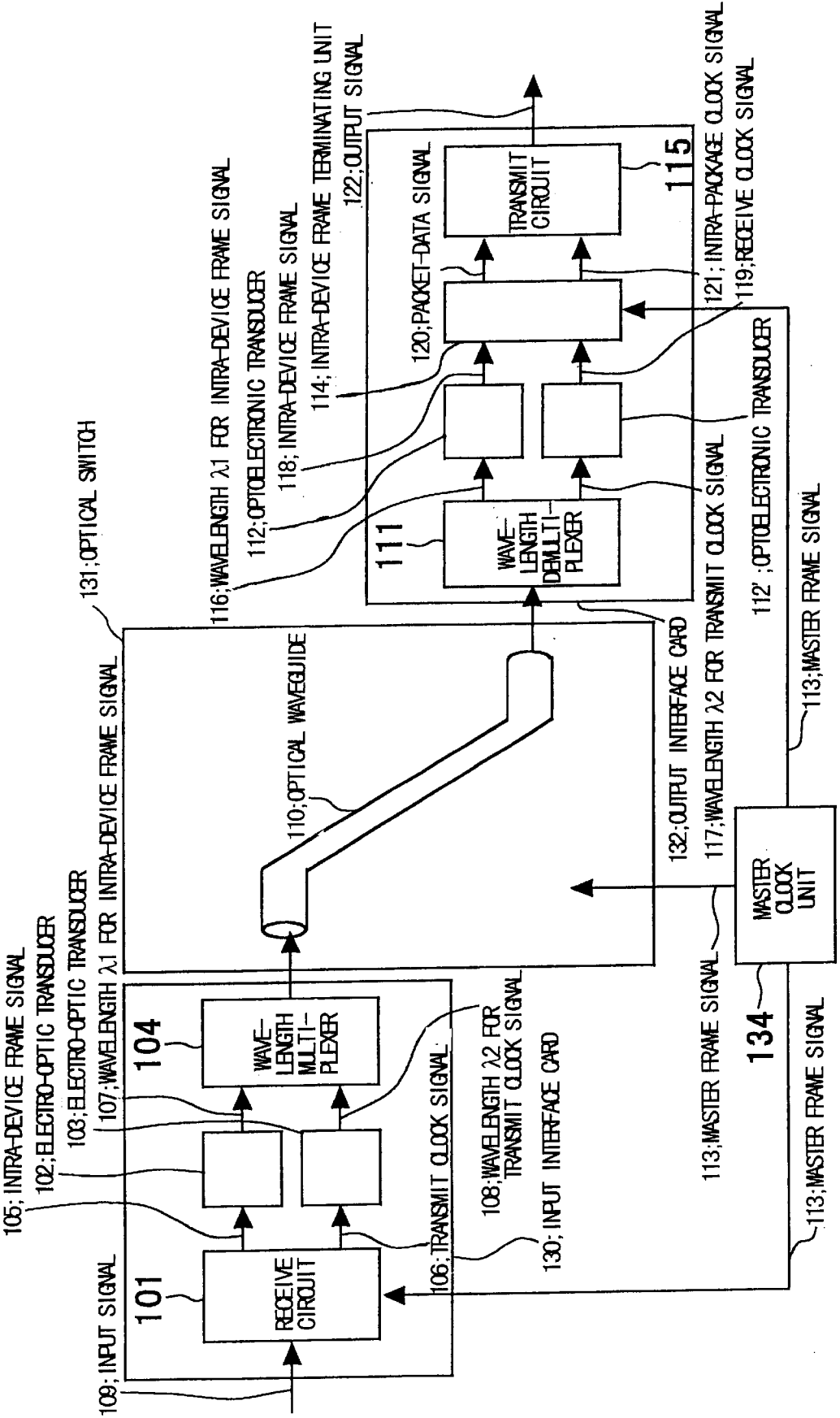
FIG. 1 is a block diagram showing the principal components of the structure of an optical packet switch according to an embodiment of the present invention.

FIG. 1 is a block diagram illustrating the structure of the input interface card 130 and the structure of the output interface card 132. As shown in FIG. 1, the input interface card 130 includes a receive circuit 101, first and second electro-optic transducers 102, 103 and a wavelength multiplexer 104. The output interface card 132 includes a wavelength demultiplexer 111, first and second optoelectronic transducers 112, 113', an intra-device frame terminating unit 114 and a transmit circuit 115.

Figure 3:
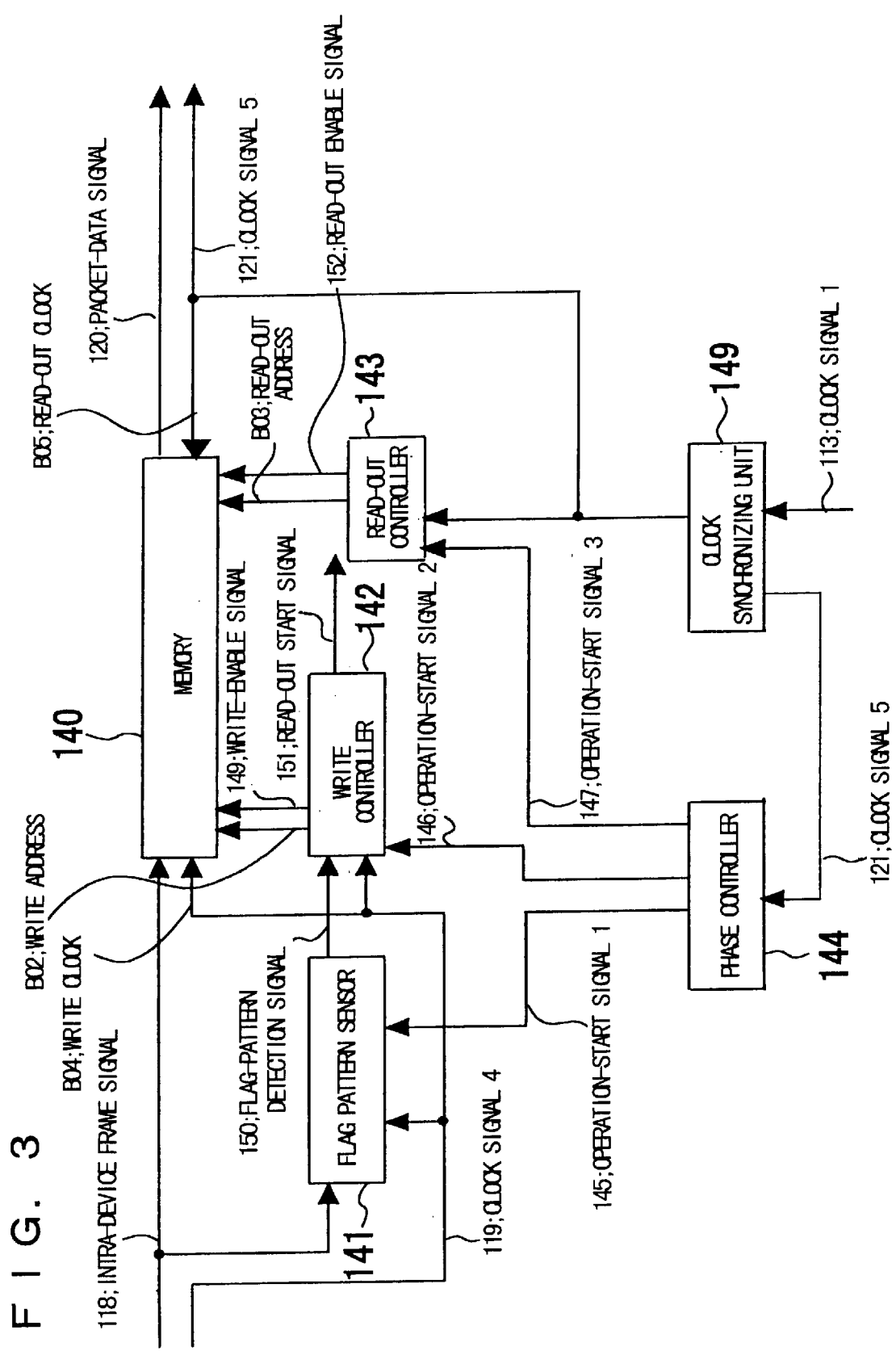
FIG. 3 is a block diagram showing the structure of a frame terminating unit in this embodiment of the present invention.

FIG. 3 is a diagram showing the structure of the intra-device frame terminating unit 114. As shown in FIG. 3, the intra-device frame terminating unit 114 includes a memory 140, a flag-pattern sensor 141, a write controller 142, a read controller 143, a phase controller 144 and a clock synchronizing unit 149.

With reference again to FIG. 4, the optical switch 131, which is composed of optical elements, sets up the connection of an optical waveguide 110 from any of the input interface cards 130 to any of the output interface cards 132 in accordance with the switch setting signal 136 sent from the packet scheduler 133.

When packet data is transferred from the input interface card 130 to the optical switch 131 in this mode of the present invention, an intra-device frame signal 105 containing this packet data is newly introduced, the intra-device frame signal 105 is converted to an intra-device frame signal wavelength ($\lambda$1) 107 via the first electro-optic transducer 102, a transmit clock signal 106 synchronized to the intra-device frame signal is converted to a transmit clock signal wavelength ($\lambda$2) 108 via the second electro-optic transducer 103, and the optical signals having the two wavelengths $\lambda$1, $\lambda$2 are multiplexed by the wavelength multiplexer 104 and transferred to the optical switch 131.

As a result, the packet data that enters the input interface card 130 and the synchronized clock signal are sent to the output interface card 132 as optical signals of two wavelengths ($\lambda$1, $\lambda$2) transmitted over the same optical waveguide 110 within the optical switch 131.

The two wavelengths, namely the intra-device frame signal wavelength ($\lambda$1) 107 and the transmit clock signal wavelength ($\lambda$2) 108, are thus wavelength multiplexed and transferred over the optical waveguide 110. These wavelengths are respectively demultiplexed to an intra-device frame signal wavelength ($\lambda$1) 116 and a transmit clock signal wavelength ($\lambda$2) 117 by the wavelength demultiplexer 111, the optical signals demultiplexed to the wavelengths $\lambda$1, $\lambda$2 are respectively converted to an intra-device frame signal 118 and a receive clock signal 119, which are electric signals, via the first and second optoelectronic transducers 112, 113', respectively, and then the intra-device frame terminating unit 114 extracts the packet data from the intra-device frame signal 118 based upon the receive clock signal 119.

In regard to a specific one of the output interface cards 132, intra-device frame signals are transferred from different input interface cards 130 via the optical switch 131 at a period having the length of the intra-device frame signal. The output interface card 132 must therefore have clock information for receiving each of the intra-device frame signals. It is difficult for the output interface card to produce all of this clock information.

However, in this mode of practicing the present invention, the clock information is transmitted along with the intra-device frame signal. The output interface card 132, therefore, is capable of extracting the intra-device frame and of extracting the packet data contained in the intra-device frame without being required to perform the highly precise clock adjustment described above.

In this mode of the present invention, the intra-device frame constituting the signal transferred through the optical switch 131 has a frame format of the kind shown in FIG. 5(a). As shown in FIG. 5(a), an intra-device frame 160 includes a preamble 161, a flag pattern 162, a data field 163 and dummy data 164. By providing the preamble 161 at the beginning of the intra-device frame 160, the output interface card 132 is capable of accommodating a change in phase that accompanies the transfer of each intra-device frame in a case where the intra-device frame signal wavelength ($\lambda$1) 107 and transmit clock signal wavelength ($\lambda$2) 108 are successively transferred from different input interface cards 130.

Furthermore, by providing the flag pattern 162, it is possible to sense the timing at which the writing of the data field 163 to the memory 140 of the intra-device frame terminating unit 114 starts (i.e., the position at which the data field starts).

By providing the intra-device frame 160 with the time interval afforded by the dummy data 164 that follows the data field 163, processing for writing the data field 163 (the packet data) to the memory 140 of the intra-device frame terminating unit 114 can be concluded before the optical waveguide 110 in the optical switch 131 is switched to transfer the next intra-device frame.

As shown in FIGS. 5(c) and (d), the data field comprises an ID (identification information) C01, length (length information) C02 and packet data C03. The data in the length field C02 indicates the length of valid data C04 in the packet data C03.

Figure 5:
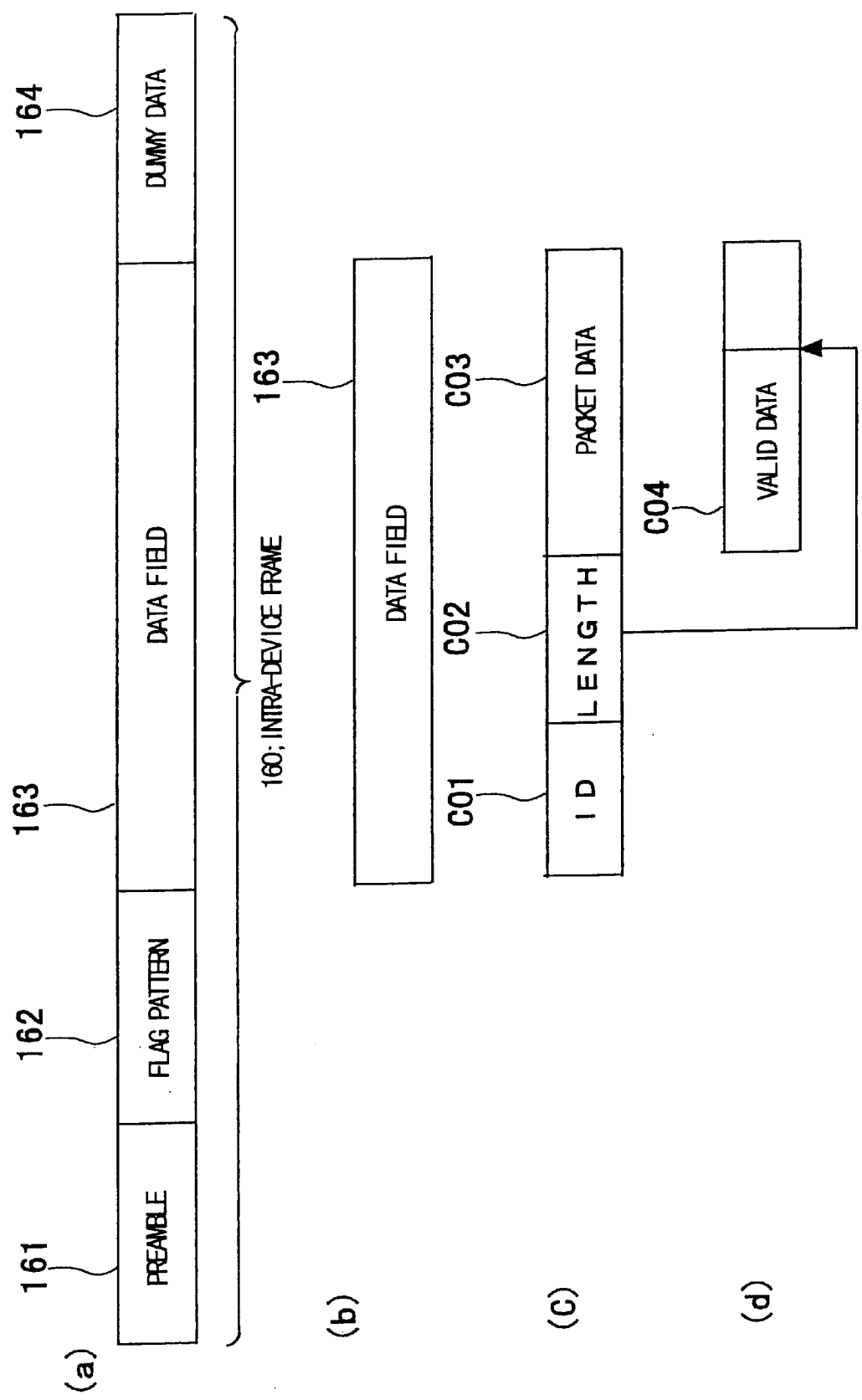
FIG. 5 is a diagram showing an example of a frame format of a frame used in the device of this embodiment.

Thus, in this mode of the present invention, the intra-device frame 160 shown in FIG. 5 is newly introduced and the preamble 161, flag pattern 162, data field 163 and dummy data 164 and provided in the frame. As a result, the output interface card 132 is capable of extracting the packet data even in a case where the optical waveguide 110 of the optical switch 131 is switched to successively transfer packets from different input interface cards 130 to the output interface card 132 and even when the clock information differs from one packet to another.

In this mode of the present invention, as shown in FIG. 3, the intra-device frame terminating unit 114 to which the intra-device frame signal 118 and receive clock signal (4) 119 are input includes the memory 140, the flag-pattern sensor 141, the write controller 142, which is for controlling write and read operations of the memory 140, the read controller 143, the phase controller 144, which controls the start of operation of the flag-pattern sensor 141, write controller 142 and read controller 143, and the clock synchronizing unit 149 for generating an intra-package clock signal 121 from the master frame signal 113. In response to start-operation command signal 145 from the phase controller 144, the flag-pattern sensor 141 senses the flag pattern 162. When this occurs, the write controller 142 applies a write-enable signal 149 to the memory 140 so that the data field 163 following the flag pattern 162 in the intra-device frame signal 118 is written to the memory 140 at the timing of the clock signal (4) 119 (write clock B04). The read controller 143 receives a read-start signal 151 from the write controller 142 and applies a read-enable signal 152 to the memory 140 so that the data that has been written to the memory 140 is read out by the intra-package clock signal 121.

By virtue of the arrangement described above, the intra-device frame terminating unit 114 is capable of extracting the packet data from the data field 163 and of reading out the packet data in sync with the intra-package clock signal 121 used within the package.

A preferred embodiment of the present invention will now be described in greater detail by way of EXAMPLES.

EXAMPLES

Figure 4:
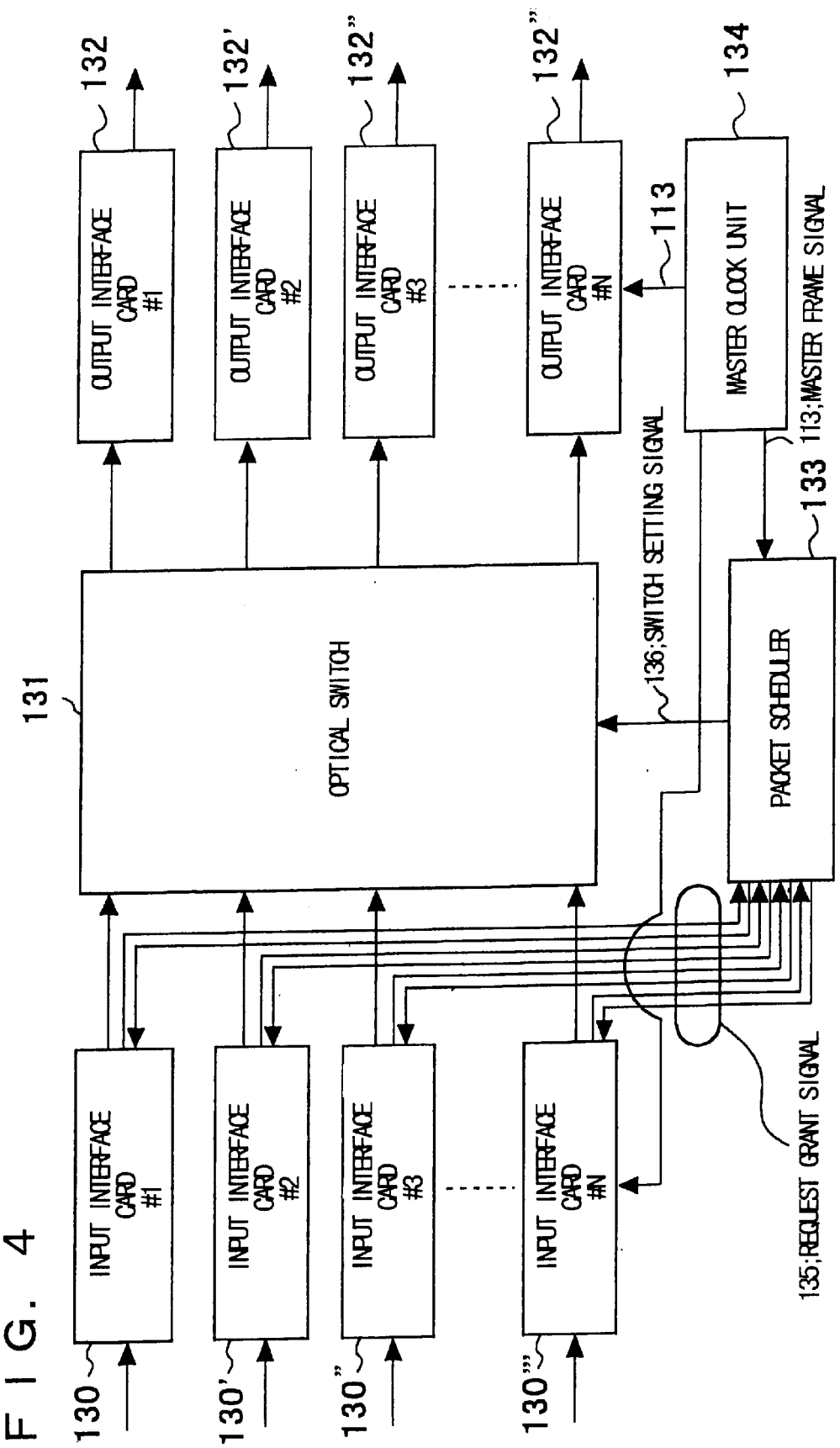
FIG. 4 is a block diagram showing the overall configuration of the embodiment.

FIG. 4 is a block diagram showing the overall system configuration of an embodiment of an optical packet switch according to the present invention. As shown in FIG. 4, this embodiment includes the input interface card 130, the optical switch 131, the output interface card 132, the master clock unit 134 and the packet scheduler 133.

FIG. 1 is a block diagram illustrating the principal components shown in FIG. 4. As shown in FIG. 1, the input interface card 130 includes the receive circuit 101 for receiving an input signal (an electric signal) 109 from a transmission line, extracting packet data from the payload of the frame, converting this packet data to the format of the intra-device frame, producing the intra-device frame 160 having a length equivalent to the master-frame period based upon the master frame signal 113 from the master clock unit 134, and outputting the intra-device frame signal 105 and transmit clock signal 106; the first and second electro-optic transducers 102, 103, to which the intra-device frame signal 105 and transmit clock signal 106 from the receive circuit 101 are respectively input, for converting these signals to optical signals and outputting the same; and the wavelength multiplexer 104 for wavelength multiplexing and optically outputting the optical in-device frame signal wavelength 107 and optical transmit clock signal wavelength 108 from the first and second electro-optic transducers 102, 103, respectively.

The output interface card 132 includes the wavelength demultiplexer 111, to which the optical signals from the selected optical waveguide in the optical switch 131 are input, for separating the signals into the intra-device frame signal wavelength 116 and transmit clock signal wavelength 117; the first and second optoelectronic transducers 112, 113', to which the intra-device frame signal wavelength 116 and transmit clock signal wavelength 117 are input, for converting these optical signals to electric signals: the intra-device frame terminating unit 114, which receives the intra-device frame signal 118 and receive clock signal 119 from the first and second optoelectronic transducers 112, 113', respectively, for extracting the packet data from the intra-device frame signal based upon the master frame signal 113 from the master clock unit 134 and the intra-package clock signal (intra-device clock signal); and the transmit circuit 115 for transmitting packet data 120 from the intra-device frame terminating unit 114. It should be noted that the wavelength multiplexer 104 and wavelength demultiplexer 111 comprise an optical multiplexer and an optical demultiplexer, respectively. The optical demultiplexer can be a well-known interference-film filter (wavelength filter) comprising wavelength-selective multiple layers of dielectric film or a fused optical-fiber coupler serving as a directional coupler. The optical multiplexer can be realized by reversing the input and output directions of the optical demultiplexer.

FIG. 5 is a diagram showing an example of the format of the intra-device frame 160, namely the transfer format of a packet transferred through the optical switch 131.

As shown in FIG. 5, the intra-device frame 160 includes, from the leading end thereof, the preamble 161 of predetermined length, the flag pattern 162, the data field 163 and the dummy data 164. The packet information (packet data) is transferred upon being planted in the data field 163 of the intra-device frame 160.

The data field 163 is subdivided into the ID (identification information) 001, the length field C02 and the packet data C03. The ID indicates the type of data contained in the packet data C03. For example, the ID identifies ATM (Asynchronous Transfer Mode) cells and IP (Internet Protocol) packets. The length field indicates the area in which valid data is actually placed in the packet data C03. The number of bytes or bits, which is indicated by the data in the length field, from the beginning of the packet data constitutes the effective data area.

The preamble, flag pattern, data field and dummy data defined in the intra-device frame are of fixed lengths. In addition, the ID and length fields in the data field also are of fixed lengths.

Figure 2:
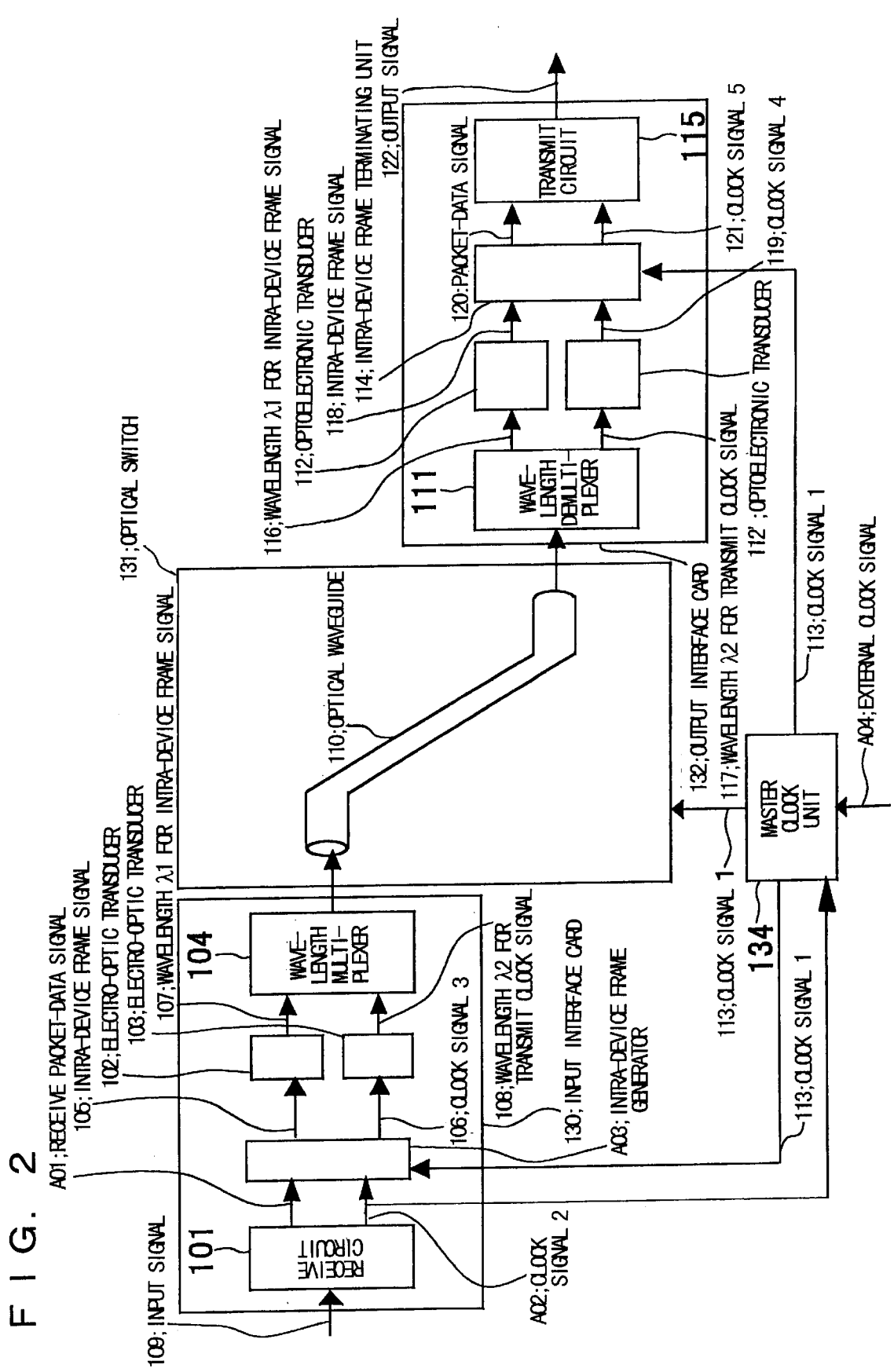
FIG. 2 is a block diagram illustrating the optical packet switch and showing the clock paths and the structure of an input section.

FIG. 2 is a block diagram illustrating the details of the clock paths and the details of the input interface card 130 in the embodiment constructed as shown in FIG. 1. As illustrated in FIG. 2, the master clock unit 134 selects a clock signal (2) A02 transferred from the receive circuit 101, an external clock signal A04 or a clock signal generated by an oscillator (not shown) provided in the master clock unit 134 and defines this clock as the reference clock used in the device.

The master clock unit 134 frequency-divides the reference clock to produce a clock signal (1) 113 equivalent to the length of the intra-device frame, and distributes the clock signal (1) to each of the blocks as the master frame signal 113 (see FIG. 1).

In the input interface card 130, the receive circuit 101 extracts the transmission-line clock and transfers the clock to an intra-device frame generator A03. The latter generates a clock signal (3) 106 (this is the transmit clock signal of FIG. 1) synchronized to the clock signal (1) 113 from the master clock unit 134, and transfers this signal to the next stage. The intra-device frame generator A03 further switches over a receive packet-data signal A01, which is synchronized to the clock signal (2) A02 sent from the receive circuit 101, to the clock signal (3) 106, places this signal in the intra-device frame to generate the intra-device frame signal 105, and transfers the intra-device frame signal 105 and the clock signal (3) 106 to the electro-optic transducers 102, 103, respectively. The optical signal 107 of the intra-device frame signal and the optical signal 108 of the clock signal (3) are wavelength multiplexed by the wavelength-multiplexer 104 and the wavelength-multiplexed optical signals are sent to the optical waveguide 110 of the optical switch 131.

Meanwhile, in the output interface card 132, the optical signals transferred from the optical waveguide 110 of optical switch 131 are wavelength demultiplexed into the intra-device frame signal wavelength 116 and a transmit clock signal wavelength 117, respectively, by the wavelength demultiplexer 11 . These are converted to electric signals by the optoelectronic transducers 112, 113' and output as the intra-device frame signal 118 and clock signal (4) 119, respectively. The intra-device frame terminating unit 114 receives the clock signal (4) 119 and the intra-device frame signal 118 from the optoelectronic transducers 112, 113', respectively, generates a clock signal (5) 121 (also referred to as the "intra-package clock signal") synchronized to the clock signal (1) (master frame signal) 113 supplied from the master clock unit 134, hands the intra-device frame 160 from the clock signal (4) 119 over to the clock signal (5) 121, extracts the packet data C03 (see FIG. 5) from the intra-device frame 160 and transfers this data to the transmit circuit 115 together with the clock signal (5) 121.

The transmit circuit 115 outputs the packet data on the transmission line using the clock signal (5) 121 as the transmit clock.

The intra-device frame terminating unit 114 according to this embodiment will now be described. FIG. 3 is a block diagram showing the structure of the intra-device frame terminating unit 114 according to this embodiment. As shown in FIG. 3, the intra-device frame terminating unit 114 includes the memory 140, the flag-pattern sensor 141, the write controller 142, the read controller 143 and the phase controller 144.

The memory 140, which comprises a dual-port memory, is capable of simultaneous write and read operations as long as the write address B02 and read address B03 differ. The memory 140 undergoes the write and read operations in sync with clock signals. When the write-enable signal 149 is active, data is written to an address, which is designated by the write address B02, at the rising edge of the write clock B04. When the read-enable signal 152 is active, on the other hand, data is read out of an address, which is accessed by the read address B03, at the rising edge of a read clock B05.

The intra-device frame terminating unit 114 extracts the packet data from the intra-device frame 160, which is transferred via the optical switch 131, using the clock signal (4) 119 transferred via the same path through the optical switch 131. The packet data 003 in the intra-device frame 160 is extracted in sync with the clock signal (5) 121, which is used in processing on the side of the output transmission line, from the intra-device frame terminating unit 114 in the output interface card 132. The clock signal (5) 121 is generated from the clock signal (1) (the master frame signal) 113 in the clock synchronizer 149 and is synchronized to the clock signal (1) 113.

Clock changeover of the intra-device frame 160 in the intra-device frame terminating unit 114 will now be described.

First, after the clock signal (4) 119 serving as the write clock has stabilized sufficiently, the intra-device frame 160 transferred from the optical switch 131 is retimed by the clock signal (4) 119 transferred similarly, and the flag pattern 162 is sensed by the flag-pattern sensor 141. As a result, the beginning of the data field 163 that is to be transferred is sensed. The data field 163 is contained in the intra-device frame 160.

The data to be written to the memory 140 corresponds to the data field 163 (see FIG. 5). Upon receiving a flag-pattern detection signal 150 from the flag-pattern sensor 141, therefore, the write controller 142 controls the writing of the data field to the memory 140.

In this example, the length of the data field is fixed. The write controller 142, therefore, performs control in such a manner that writing takes place for a period equivalent to the length of the data field. More specifically, the write-enable signal 149 is activated only when the data field 163 is input to the memory 140. The dual-port memory constituting the memory 140 is required to be operated in such a manner that write and read operations will not occur at the same address. Accordingly, if it is so arranged that the data field 163 is read out (interval D04 in FIG. 6) several bits after the writing of the data field to the memory 140 begins, then the write and read addresses will always be staggered by several bits. This not only makes it possible to avoid the occurrence of collision between the write and read addresses of the dual-port memory but also makes it possible to suppress, to several bits, the delay that accompanies the writing and reading of data to and from the memory 140.

Since the bits read out of the memory 140 after the write operation constitute the data actually retained in the memory, the fact that data is read out in several bits after the write operation means that the data retained in the dual-port memory need only be several bits This makes it possible to reduce greatly the scale of the circuitry in memory 140 in which the write and read operations take place at high speed. It is also possible to implement the memory 140 using shift registers instead of a dual-port memory.

It should be noted that the phase controller 144 and read controller 143 cannot reliably identify, bit by bit, when a write operation will take place owing to skew when data is transferred through the optical switch 131. Accordingly, several bits after the writing of the data field 163 to the memory 140 starts, the write controller 142 outputs the read-start signal 151 to the read controller 143 to command start of the read operation. After receiving the read-start signal 151, the read controller 143 starts the read-out of the packet data C03 in data field 163 in sync with the clock signal (5) 121. The read-out interval lasts for the length of the packet data C03.

Thus, the intra-device frame terminating unit 114 makes it possible to implement, at low cost and with little delay, the changeover from the clock signal (1) 113 having skew to the clock signal (5) 121 used by the output interface card 132.

The phase controller 144 issues operation-start signals to each of the processing circuits in the intra-device frame terminating unit 114 in order to reset these circuits.

Skew develops in the input intra-device frame 160 and accompanying clock signal (4) 119 owing to intervention of the optical switch 131 and, as a result, frame phase delay on the order of several bits occurs. However, since maximum skew and minimum skew can be determined from the characteristics of the optical devices used in the optical switch 131, the maximum or minimum number of bits the frame phase will be delayed can be specified.

In order to avoid malfunction in each of the other blocks, the operation-start signals of the phase controller 144 is for initializing the states of the processing circuits in the blocks before each individual block starts operating.

More specifically, after instability of the clock signal (4) 119 that accompanies switching of the optical switch ends, an operation-start signal (1) 145 is issued to the flag-pattern sensor 141 in order to sense the flag pattern 162.

Similarly, in order to initialize the write controller 142 before the intra-device frame 160 arrives at the memory 140, an operation-start signal (2) 146 is issued to the write controller 142. In order to initialize the read controller 143 before it reads out data, an operation-start signal (3) 147 is issued to the read controller 143.

Accordingly, the timings of the operation-start signal (1) 145, operation-start signal (2) 146 and operation-start signal (3) 147 are always delayed from left to right.

Figure 6:
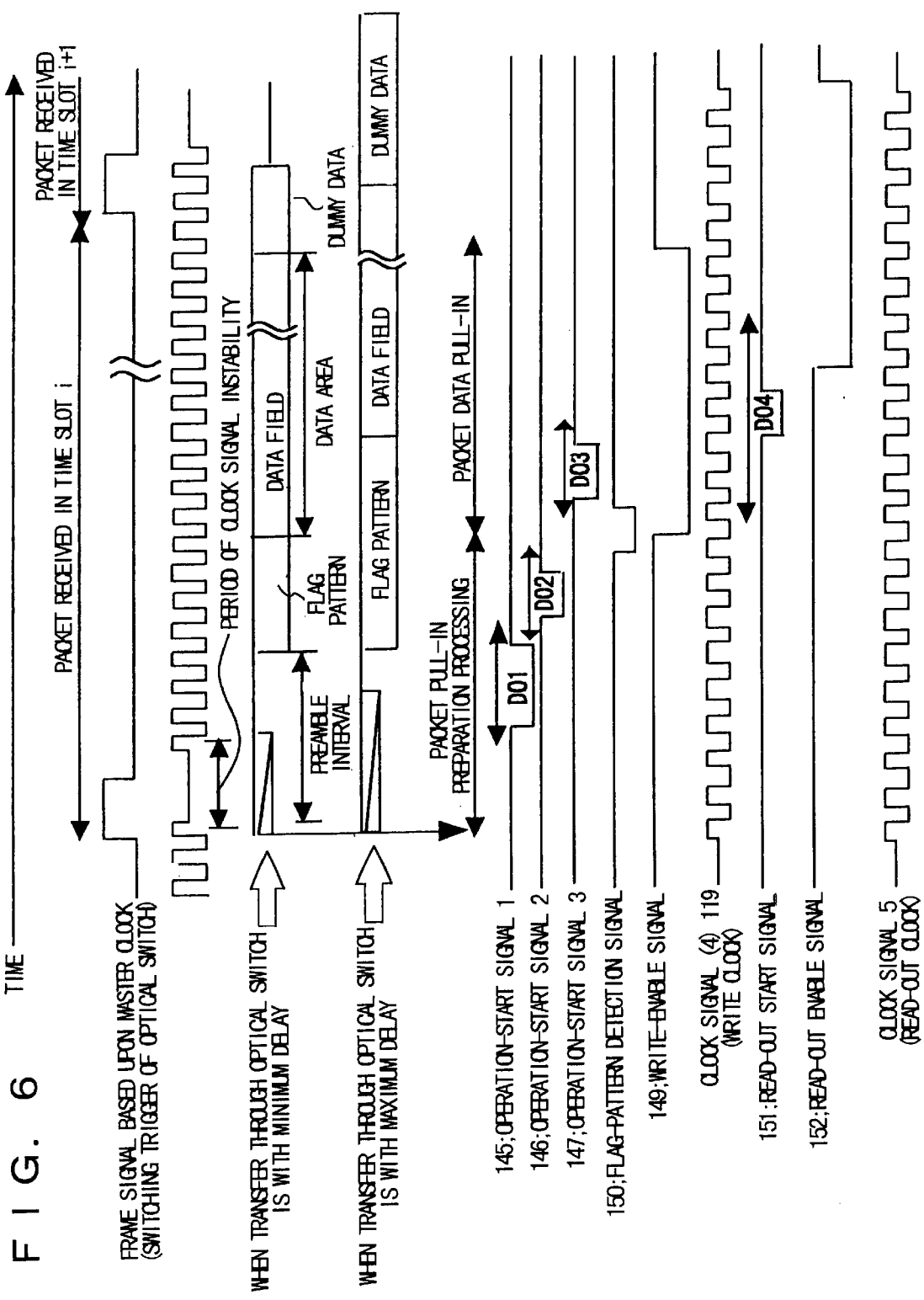
FIG. 6 is a timing chart useful in describing the operation timing of this embodiment.

FIG. 6 illustrates an example of the timings of the operation-start signal (1) 145, operation-start signal (2) 146 and operation-start signal (3) 147. As shown in FIG. 6, each of the operation-start signals is issued in an interval from a case where start of operation of a processing circuit to be initialized occurs latest to a case where start of operation of the processing circuit occurs earliest.

More specifically, the operation-start signal (1) 145 to the flag-pattern sensor 141 that deals with the flag pattern 162 is issued during the period of D01 in FIG. 6, the operation-start signal (2) 146 to the write controller 142 that writes the data field 163 is issued during the period of D02, and the operation-start signal (3) 147 to the read controller 143 that reads out the data field 163 is issued during the period of D03.

The operation of this embodiment of the invention constructed as set forth above will now be described.

With reference to FIG. 1, a packet is transferred to the input interface card 130 of the optical packet switch as the input signal 109 on a transmission line. The input signal 109 is terminated at the receive circuit 101 of the input interface card 130. The receive circuit 101 performs frame termination on the transmission line, extracts a packet from the payload of the frame and transfers the packet to the next stage.

The receive circuit 101 that has received a packet refers to the header information (destination information) of the packet and decides to which output interface card 132 in the device the packet is to be transferred.

Further, as shown in FIG. 4, in order to transfer packet data to the destination output interface card 132 through the optical switch 131, a request signal 135 is sent to the packet scheduler 133. The request signal 135 contains the intra-device address of the destination output interface card 132 to which the input interface card 130 is to transfer the packet.

On the basis of the request signal 135 issued from each input interface card 130, the packet scheduler 133 decides between which input interface card and which output interface a transfer is to be allowed and sends a grant (enable) signal 135 to the input interface card 130 for which transfer was allowed.

The request signal 135 is a signal that notifies each input interface card 130 to which output interface card 132 it is permissible to transfer a packet.

The packet scheduler 133 sends the optical switch 131 the switch setting signal 136 together with the grant signal 135.

As shown in FIGS. 4 and 1, the optical switch 131 connects the optical waveguide 110 between any input interface card 130 and any output interface card 132 in accordance with the switch setting signal 136. The switching of the optical waveguide 110 in optical switch 131 is carried out whenever the master frame signal 113 is supplied by the master clock unit 134.

Figure 7:
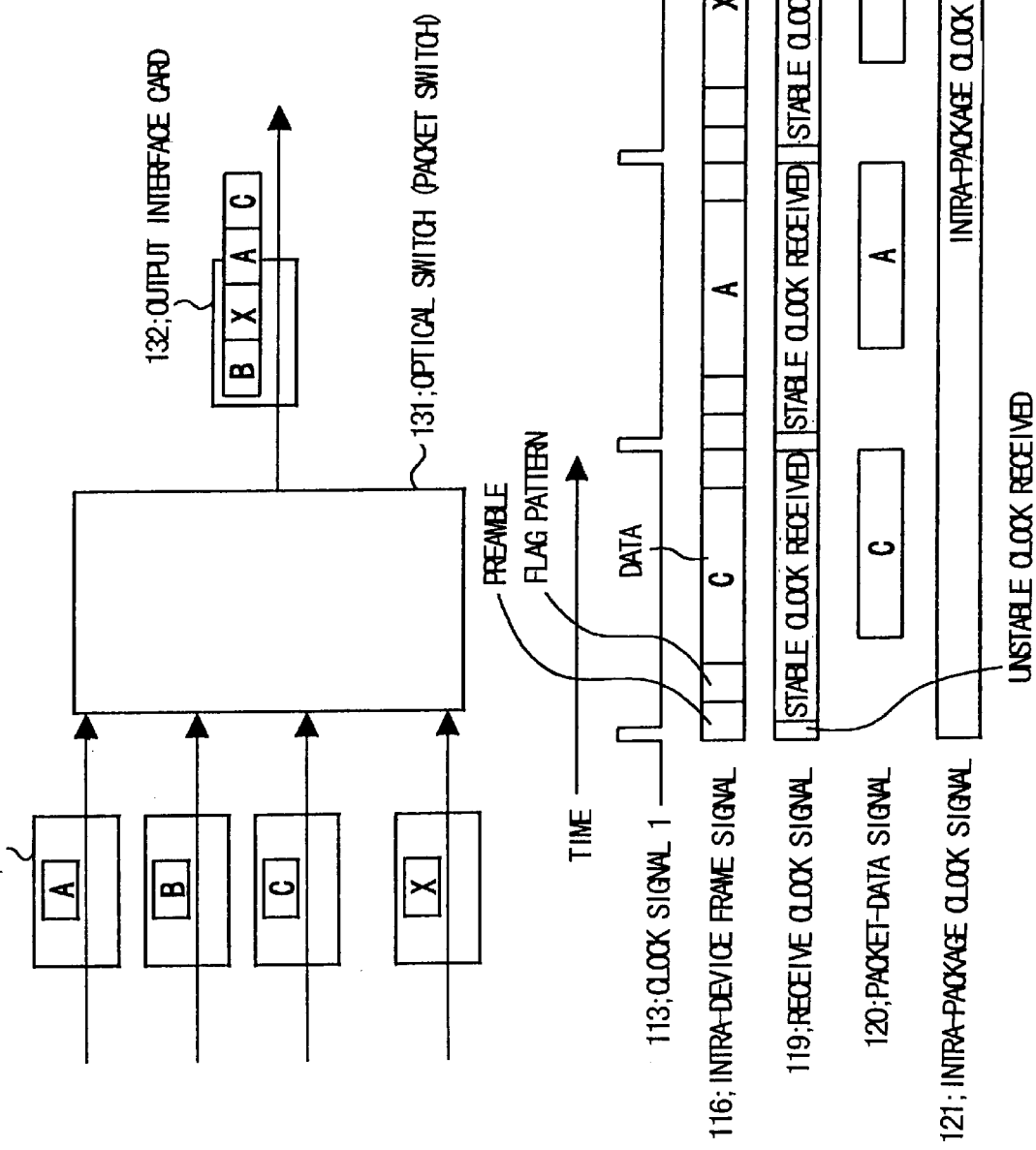
FIG. 7 is a diagram useful in describing the operation of this embodiment.

FIG. 7 is a diagram useful in describing an example of the present invention. By connecting the optical waveguide 110 (see FIG. 1) within the optical switch 131 per master frame signal 113 sent by the master clock unit 134 (see FIG. 4), packets A, B, C, X that have been transferred from a plurality of different input interface cards 130 are transferred to a certain output interface card 132 in the order C→A→X→B in sync with the master frame signal 113.

The receive circuit 101 of an input interface card 130 that has received the grant signal 135 from the packet scheduler 133 converts the retained packet to the format (see FIG. 5) of the intra-device frame 160. That is, the packet data is planted in the data field 163 of the intra-device frame 160, the preamble 161 of the fixed length and the flag pattern 162 of the fixed pattern are added on and the dummy data 164 is added onto the end of the data field 163 to thereby produce the intra-device frame 160 having the master-frame period length that is based upon the master frame signal 113.

The master frame signal 113, which stipulates the intra-device period, always has a fixed length. As a result, the length (bit length) of the intra-device frame 160 (see FIG. 5) also has a fixed length.

In an example of the present invention, if packet data has a length longer than that of the data field 163 in the intra-device frame signal 160, the receive circuit 101 executes processing for dividing the packet data into a plurality of intra-device frames and outputting the data as a plurality of intra-device frames.

The intra-device frame is transferred to the first electro-optic transducer 102 as the intra-device frame signal 105, whereby the frame is converted to the intra-device frame signal wavelength ($\lambda 1$) 107. Further, the transmit clock signal 106 synchronized to the intra-device frame signal 105 is converted to the transmit clock signal wavelength ($\lambda 2$) 108 by the second electro-optic transducer 103. The optical signals 107, 108 of the respective wavelengths $\lambda 1$, $\lambda 2$ are both input to and wavelength multiplexed by the wavelength multiplexer 104 and the wavelength-multiplexed optical signals are transferred to the optical switch 131.

The optical switch 131 transfers the packet data, which has been obtained by wavelength multiplexing the intra-device frame signal(λ1) and transmit clock signal (λ2) sent from the input interface card 130 as described above, to the output interface card 132, which is the destination of the transfer, via the same optical waveguide 110.

The optical waveguide 110 in the optical switch 131 is set up selectively at the master-frame period, which is the length of the intra-device frame. The optical signals of multiplexed wavelengths λ1, λ2 are transferred to the output interface card 132, which is the destination of the transfer, and enter the wavelength demultiplexer 111.

The wavelength demultiplexer 111 demultiplexes (separates) the optical signals of λ1, λ2 from the wavelength-multiplexed optical signals, and sends them to the respective first and second optoelectronic transducers 112, 113', which constitute the next stage, as the intra-device frame signal wavelength (λ1) 116 and transmit clock signal wavelength (λ2) 117, respectively. The first and second optoelectronic transducers 112, 113' convert these signals to electric signals and send them to the intra-device frame terminating unit 114 as the intra-device frame signal 118 and receive clock signal 119, respectively. By way of example, the first and second optoelectronic transducers 112, 113' may each comprise a photodiode, an amplifier for converting the output current of the photodiode to a voltage and amplifying the same, and a buffer circuit for shaping the waveform of the amplifier output and then delivering the output.

Thus, the intra-device frame signal 118 and the receive clock signal 119 of the intra-device frame enter the intra-device frame terminating unit 114 in sync with the master frame signal 113, which is the reference frame period in the optical packet switch.

It should be noted that the receive clock signal wavelength 119 (an electric signal) transferred to the output interface card 132 per intra-device frame is unstable for a fixed interval of time that starts from the leading edge of the master frame signal 113, as shown in FIG. 7. The reason for this is that since the optical waveguide connecting a certain input interface card 130 and the output interface card 132 selected as the transfer destination is switched in the input interface card 130 based upon the master frame signal 113, the switching of the optical waveguide is accompanied by signal discontinuity. Owing to this signal discontinuity, the receive clock signal 119 is disturbed for a time equivalent to several bits and the intra-device frame terminating unit 114 therefore cannot retime the intra-device frame signal 118 correctly using the receive clock signal 119.

In order to avoid the effects of this, in an example of the present invention provides the following. The intra-device frame 160 is provided with the interval of time corresponding to the preamble 161 (which may even comprise a single bit, by way of example). After the receive clock signal 119 stabilizes during the interval of the preamble 161, the intra-device frame terminating unit 114 retimes the intra-device frame signal 118 by the receive clock signal 119 from the second optoelectronic transducer 113'. It should be noted that the length of the preamble 161 is designed to accommodate skew in a case where a transfer is made from the optical switch 131 with minimum delay and with maximum delay, as depicted in FIG. 6.

The flag pattern 162, which follows the preamble 161 in the intra-device frame 160, is sensed by the flag-pattern sensor 141 and the packet data in the data field 163 that follows the flag pattern 162 is stored in the memory 140. In other words, upon receiving the flag-pattern detection signal 150 from the flag-pattern sensor 141, the write controller 142 applies the write-enable signal 149 to the memory 140, whereby the packet data in the data field 163 is written to the memory 120 in sync with the receive clock signal 119.

The read controller 143 applies the read-enable signal 152 to the memory 140 and the packet stored in the memory 140 is read out by the intra-package clock signal 121. The read controller 143 receives the read-control (start) signal 151 from the write controller 142 and supplies the read-enable signal 152 to the memory 140. The timing at which the read-out of the packet data from the memory 140 is to begin is control led so as to take place several bits after the packet data is written to the memory 140, by way of example.

By virtue of this arrangement, the packet data is read out in sync with the intra-package clock signal 121 within the output interface card 132 and is transferred to the next stage. The detail s of the operation set forth above will now be described.

FIG. 6 is a timing chart for describing the timing operation of an example of the present invention. The input interface card 130 that is the source of the transmission is switched at the beginning of the master frame signal 113. As a consequence, both the intra-device frame signal 118 and receive clock signal 119 become discontinuous and, in regard to the receive clock signal 119, a period develops in which the signal becomes unstable, as shown in FIG. 6.

In order that erroneous intra-device frame data obtained by retiming the intra-device frame signal 118 by the discontinuous receive clock signal 119 will not be sensed in the intra-device frame terminating unit 114, the phase controller 144 applies the operation-start signal (1) 145 and the operation-start signal (2) 146 to the flag-pattern sensor 141 and write controller 142, respectively, to stop the sensing of the flag pattern in the flag-pattern sensor 141 during the unstable period of the receive clock signal. This instability in the clock signal is merely a temporary phenomenon caused by switching over the input interface card that is the source of the transmission. The halting of the sensing operation in the flag-pattern sensor 141 usually need last only for a time equivalent to several bits.

The intra-device frame signal 118 is subsequently retimed by the receive clock signal 119 from the second optoelectronic transducer 113'. When the flag-pattern sensor 141, which has received the operation-start signal (1) 145 from the phase controller 144, senses the flag pattern 162 comprising the predetermined bit pattern, it sends the flag-pattern detection signal 150 to the write controller 142.

The write controller 142 receives the flag-pattern detection signal 150 from the flag-pattern sensor 141, recognizes the data field 163, which is transferred next, in the intra-device frame signal 118 and sends the write-enable signal 149 to the memory 140.

The write controller 142 initializes the writing of the data field 163 to the memory 140 in response to the operation-start signal (2) 146 from the phase controller 144, then extracts the flag-pattern detection signal 150 from the flag-pattern sensor 141 and subsequently issues the write-enable signal 149 in order that the data field 163 transferred next will be written to the memory 140.

When the write-enable signal 149 is ON, the intra-device frame signal 118 is written to the memory 140 successively in sync with the receive clock signal 119.

It should be noted that the memory 140 comprises, e.g., a dual-port memory in which the timings of the write and read operations are controlled independently.

The write controller 142 outputs the write-enable signal 149 only during the interval of the data field 163.

When the dummy data 164 is input, the write controller 142 does not output the write-enable signal 149 (i.e., the write-disable state is established). As a result, only the packet data in the data field 163 is written to the memory 140.

The read controller 143 receives the operation-start signal (3) 147 from the phase controller 144, initializes read processing and waits for the read-start signal 151 from the write controller 142.

After the write controller 142 writes several bits of the data field 163 to the memory 140, it sends the read-start signal 151 to the read controller 143. Upon receiving the read-start signal 151, the read controller 143 sends the read-enable signal 152 to the memory 140.

During the time that the read-enable signal 152 is ON, the memory 140 reads out the packet data constituting the data field 163 in sync with the intra-package clock signal 121 and transfers the packet-data signal 120 together with the intra-package clock signal 121.

Figure 8:
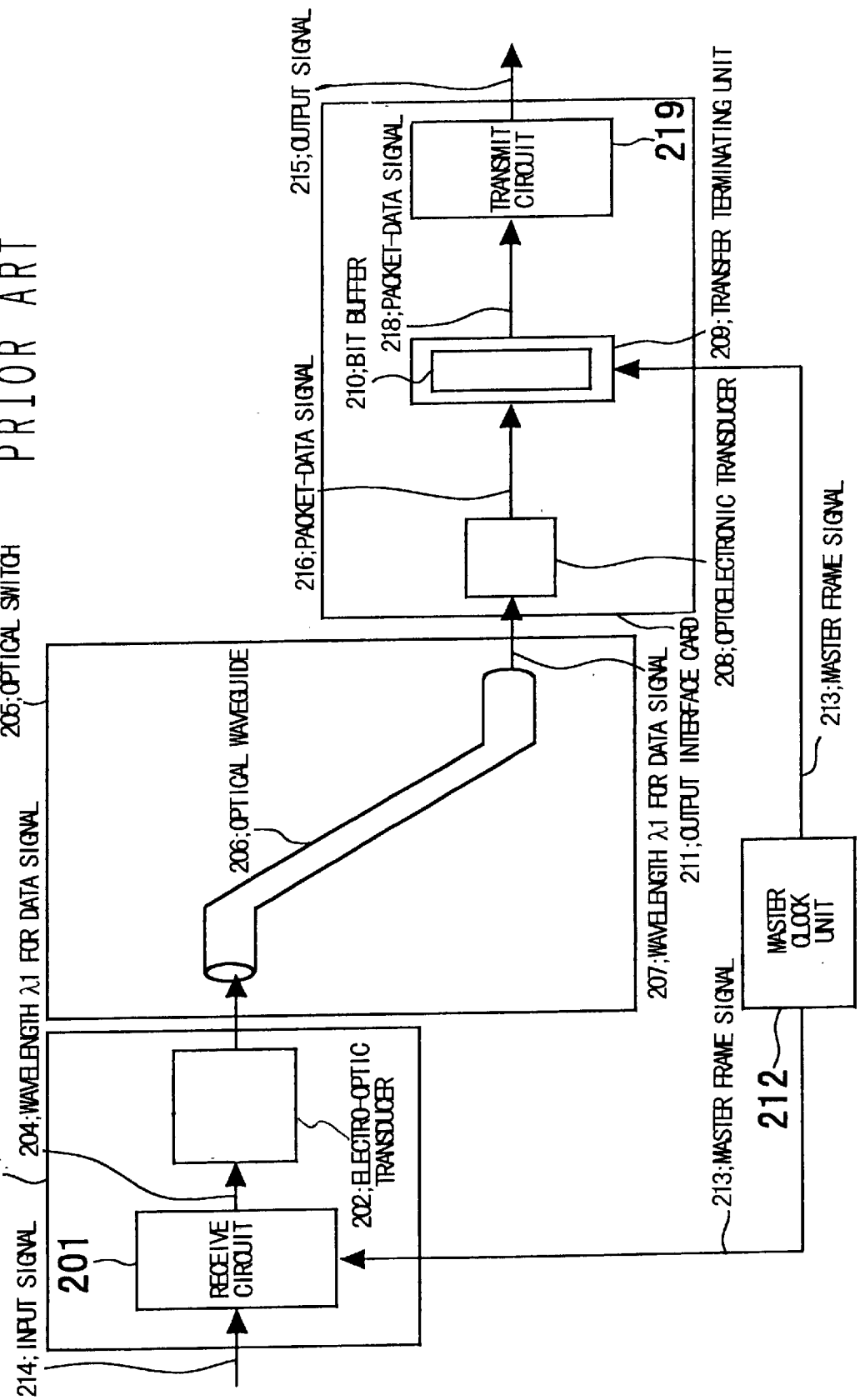
FIG. 8 is a diagram showing the structure of an optical packet switch according to an example of the prior art.
Figure 9:
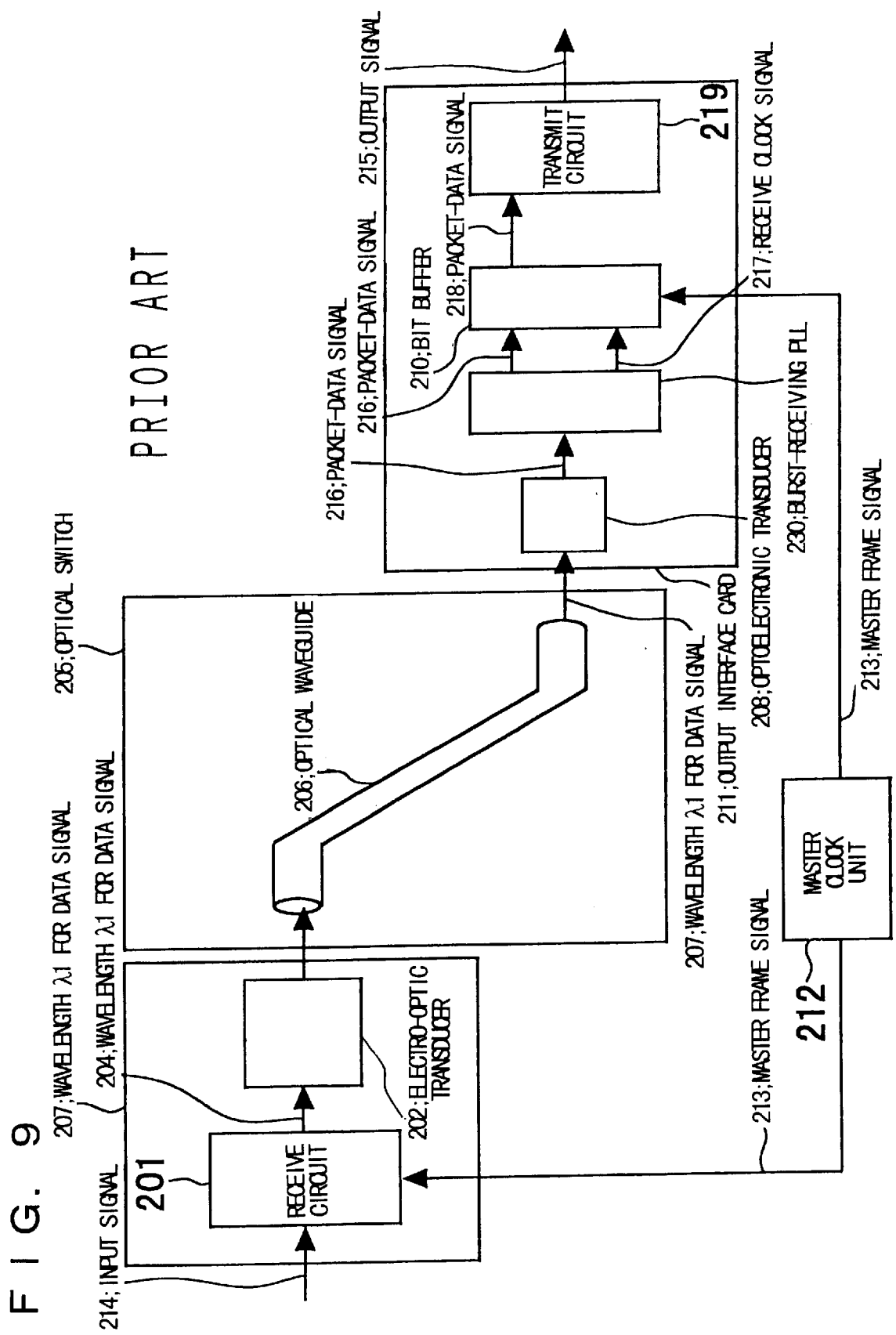
FIG. 9 is a diagram showing the structure of an optical packet switch according to another example of the prior art.

Thus, despite the fact that intra-device frames of different packets are transferred to output interface cards from input interface cards that differ for each master frame, the packet data can be accepted without synchronizing the clock period to the clock signals of these interface cards as by a PLL, as is done in the prior-art arrangement shown in FIG. 8. The packets can be read out in sync with the intra-package clock signal used within the output interface cards.

The data signal 120 read out of the intra-device frame terminating unit 114 and the intra-package clock signal 121 are transferred to the transmit circuit 115.

The latter converts the transferred packet to a format stipulated for the output signal 122 and then sends the signal to the transmission line as the output signal 122.

In a packet switch, the relationship between data and retiming clock control information is uniquely determined in each block that resides along the data transfer path within the device. Accordingly, the master clock unit within the device transfers a reference clock to each of the other blocks. By retiming the data in each of the circuit blocks in accordance with a clock phase shifted a fixed length from the reference clock, packets can be sent and received correctly.

With an optical packet switch, however, as set forth earlier, the above is difficult to obtain as a result of the fact that skew produced in the optical switch amounts to several bits or more. The present invention solves this problem by the arrangement of the embodiment described above. The principle of operation of the present invention will be described in detail again with reference to FIG. 2.

Data is received at a transmission-line input, which is the input to the device, the clock signal (2) A02 and the receive packet-data signal A01 are extracted from the data, a changeover is made to the clock signal (3) 106, which is synchronized to the clock signal (1) supplied from the master clock unit 134 in the intra-device frame generator A03, and the intra-device frame signal 105, which has been retimed by the clock signal (3) 106, is transferred to the optical switch 131 together with the clock signal (3) 106 using a different wavelength.

By transferring the two wavelengths of the intra-device frame signal and clock signal over the same path in the optical switch 131, skew between the intra-device frame signal and the clock signal is eliminated. The intra-device frame signal and the clock signal serving as the clock information for retiming the intra-device frame signal are transferred to the output interface card 132. In the output interface card 132 the intra-device frame signal 118 transferred from the optical switch 131 is retimed by the clock signal (4) 119 transferred along with the intra-device frame signal 118, whereby the intra-device frame is received and handed over to the clock signal (5) 121 synchronized to the clock signal (1) 113 used in the output interface card 132. The packet-data signal 120 is output and is sent out on the transmission line from the transmit circuit 115. As a result, a variation in bit phase and frame phase due to skew in the optical switch is accommodated and accurate retiming of the data can be achieved.

Next, the details of the structure of the intra-device frame will be described with reference to FIG. 5. Assume that 2.48832 Gbps, for example, is the speed of the transmission line. Further, assume that the switching time of the optical switch 131 is 5 nsec, and that skew when data is transferred through the optical switch 131 is ±5 nsec. If it is assumed that switching of the optical switch 131 is accommodated in the transmission interval of the dummy data 164 in intra-device frame 160, then the length of the dummy data 164 will be (5 nsec)/(2.48832 Gbps)=12.4416 bits. Thus, it will suffice to provide a dummy-data length of 13 bits or greater.

The preamble 161 in the intra-device frame 160 is a period of time provided to accommodate skew that accompanies transfer of data through the optical switch 131. It will suffice, therefore, to provide a preamble length of 13 bits or greater.

Further, the flag pattern 162, the ID and the length field should be made two bytes, two bytes and one byte, respectively. The packet data C03 is fixed at 128 bytes.

Accordingly, we have the following:

intra-device frame length=preamble length (2 bytes)+ flag-pattern length (2 bytes)+ID length (2 bytes)+ length-field length (1 byte)+dummy-data length (2 bytes)=137 bytes.

Thus, in the present embodiment of the invention, the intra-device frame 160 (see FIG. 5) has a fixed length of 137 bytes, by way of example.

In regard to transfer of the intra-device frame signal wavelength ($\lambda 1$) 107 and clock signal wavelength ($\lambda 2$) 108 transferred through the optical switch 131, use may be made of a plurality of 1.5-$\mu$m bands employed in 2.4-Gbps signal transmission.

The advantages of the present invention will be summarized below.

In the optical switch, the clock signal for retiming purposes on the output side is transferred over the same optical waveguide together with the packet-data signal by being wavelength multiplexed with the packet-data signal. When each item of packet data is received by the output interface card, the packet data and the wavelength-multiplexed clock signal are demultiplexed and the packet data is retimed. As a result, a clock adjustment in the output interface card and the provision of a sophisticated burst-receiving PLL, which are required in the prior art, are unnecessary. It is easier to facilitate the implementation a gigahertz-band packet switch and to lower the cost thereof.

An increase in the scale of the device that is proportional to the input interface card is avoided for both the electrical and optical circuitry and, as a result, cost increases can be held down.

Packet data can be retimed accurately on the output side despite a variation in bit phase and frame phase caused by skew due to transfer through the optical switch.

As many apparently widely different embodiments of the present invention can be made without departing from the spirit and scope thereof, it is to be understood that the invention is not limited to the specific embodiments thereof except as defined in the appended claims.

It should be noted that other objects and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An optical packet switch having an input unit and an optical switch, wherein said input unit is designed to multiplex a control signal with packet data, which is to be transferred to a destination output unit via said optical switch, and sends the multiplexed packet data and control signal to said optical switch, said control signal being for the purpose of retiming the packet data at the destination output unit that receives the packet data;

said input unit generating an intra-device frame signal comprising a format having dummy-bit strings of predetermined lengths, which take into consideration switching timing of said optical switch and skew produced by transfer of the packet data through said optical switch, provided at the beginning and end, respectively, of the frame, and placing the packet data in a data storage area of the intra-device frame signal to thereby transfer the packet data to said destination output unit via said optical switch.

2. The optical packet switch according to claim 1, comprising a plurality of said input units, a plurality of said output units, said optical switch, packet scheduler means and master clock generating means;

each of said input units first sending a request signal to said packet scheduler means when packet data is transferred to a destination output unit through said optical switch;

said packet scheduler means deciding, on the basis of the request signal from each input unit, an input unit and an output unit that are allowed to perform a transfer, sending an enable signal to the input unit that has been allowed to perform a transfer, sending an enable signal to the output unit that has been allowed to perform a transfer, and sending a switch setting signal to said optical switch;

said packet switch connecting an optical waveguide between the decided input unit and the output unit by the switch setting signal from said packet scheduler means; and said master clock generating means supplying said input unit, said output unit and said packet scheduler means a master clock signal for specifying a frame period.

3. An optical packet switch having an input unit and an output unit of an optical switch which performs packet switching, said input and output units each comprising an electric circuit;

wherein said input unit has a frame signal generator of an intra-device frame signal having a format comprising a preamble, dummy data and input packet data interposed between the preamble and the dummy data, said preamble and said dummy data having lengths, said intra-device frame signal generator being designed to accommodate a period of signal instability produced when switching is performed by said optical switch as well as skew caused by transferring the packet data through said optical switch, and to append a retiming control signal, which is for controlling retiming of the packet data at said output unit, to the intra-device frame signal and then sending the intra-device frame signal to an optical transmission path of said optical switch; and wherein said output unit is designed to demultiplex optical signals, which have been transferred from said optical switch, into the intra-device frame signal and retiming control signal, to retime the demultiplexed intra-device frame signal by the demultiplexed retiming control signal and outputting the packet data extracted from the intra-device frame signal upon handing the intra-device frame signal over to an output clock signal.

4. The optical packet switch according to claim 3, wherein said output unit is designed to sense a starting position of the packet data using the retiming control signal, to write the packet data, from this starting position to an end position, to a storage device using the demultiplexed timing control signal as a write control signal, and to read the packet data out of said storage device using the output control signal as a read-out signal.

5. An optical packet switch having an input unit, an optical switch which performs packet switching and an output unit thereof, said input and output units each comprising an electric circuit, wherein retiming control information, which is for retiming packet data in said output unit, is transferred in the form of an optical signal from said input unit to said output unit through said optical switch;

said input unit including:

a packet data receiver designed to receive the packet data from a transmission line and generating an intra-device frame by placing the packet data in a data field of an intra-device frame having a frame format comprising a preamble having a length that accommodates skew produced by transfer of the packet data through said optical switch, a flag pattern for sensing staring position of the data field, the data field, and dummy data having a length at least equal to switching time of said optical switch; and a wavelength multiplexer designed to wavelength-multiplex a retiming control signal, which is for retiming the packet data in said output unit, with the intra-device frame that has been generated, and to send the wavelength-multiplexed intra-device frame signal and packet data to an optical transmission path of said optical switch;

said output unit being designed to demultiplex optical signals, which have been transferred from said optical switch, into the intra-device frame signal and retiming control signal, to sense starting position of the packet data by sensing the flag pattern in the intra-device frame signal, to write the packet data from the starting position to storage means using the separated retiming control signal as a write control signal, to read the packet data out of said storage means based upon a read-out timing control signal, and to output the packet data to a transmission line via a transmit circuit.

6. An optical packet switch having an input unit, an optical switch which performs packet switching and an output unit thereof, said input and output units each comprising an electric circuit;

said input unit including:

means for receiving data at a transmission-line input and extracting a receive clock signal and a receive packet-data signal;

means for changing over from the receive clock signal to a first clock signal synchronized to a master frame signal that stipulates length of a reference frame period within the optical packet switch, achieving retiming using the first clock signal, and generating an intra-device frame signal having a frame format comprising a preamble and dummy data each of predetermined lengths, with the packet data being interposed between the preamble and the dummy data; and means for converting the intra-device frame signal and the first clock signal to mutually different optical wavelengths, wavelength multiplexing the wavelength of the intra-device frame signal and the wavelength of the clock signal and transferring the wavelength multiplexed signals to said optical switch;

said optical switch transferring the wavelength of the intra-device frame signal and the wavelength of the first clock signal over an identical path;

said output unit including:

means for demultiplexing the wavelength of the intra-device frame signal and the wavelength of the clock signal transferred from the optical switch, converting these wavelengths to respective ones of electric signals, and outputting the electric signals as an intra-device frame signal and a second clock;

means for receiving the intra-device frame signal by performing retiming using the second clock signal, changing over from the second clock signal to a third clock signal synchronized to the master clock signal, and extracting a packet-data signal from said intra-device frame signal; and means for outputting the extracted packet data to a transmission line.

7. The optical packet switch according to claim 6, wherein the intra-device frame includes, starting from a leading edge thereof, a preamble having enough length to accommodate skew that accompanies transfer of packet data through said optical switch, a flag pattern of a predetermined length, a data field, and dummy data having a length conforming to switching time of said optical switch;

said input unit placing the packet data in the data field to thereby transfer said packet data to said output unit via said optical switch.

8. The optical packet switch according to claim 6, comprising a plurality of said input units, a plurality of said output units, said optical switch, packet scheduler means and master clock generating means;

each of said input units first sending a request signal to said packet scheduler means when packet data is transferred to a destination output unit through said optical switch;

said packet scheduler means deciding, on the basis of the request signal from each input unit, an input unit and an output unit that are a lowed to perform a transfer, sending an enable signal to the input unit that has been allowed to perform a transfer, sending an enable signal to the output unit that has been allowed to perform a transfer, and sending a switch setting signal to said optical switch;

said packet switch connecting an optical waveguide between the decided input unit and the output unit by the switch setting signal from said packet scheduler means; and said master clock generating means supplying said input unit, said output unit and said packet scheduler means a master clock signal for specifying a frame period.

9. An optical packet switch having an optical switch which performs packet switching, an input unit and an output unit, a master frame signal, which specifies length of a reference frame period within said optical packet switch, being input to said optical switch, said input unit and said output unit, said optical switch switching a connection between said input and output units based upon the master frame signal;

(a) said input unit including:

(a1) means for extracting packet data from a signal input from a transmission line, bit synchronizing the packet data to a first clock signal generated using the master frame signal as a reference, and generating a fixed-length intra-device frame signal having a frame format comprising a preamble having enough length to accommodate signal skew that is caused by transfer of the signal through said optical switch, a flag pattern for sensing starting position of a data field, a data field containing the packet data, and dummy data having a length at least equal to switching time of said optical switch; and (a2) wavelength multiplexing means for wavelength multiplexing a wavelength of an intra-device frame signal and a wavelength of a clock signal obtained by converting the first-mentioned intra-device frame signal and the first clock, respectively, to optical signals having mutually different wavelengths, and sending the optical signals of the multiplexed wavelengths to said optical switch;

(b) said output unit including:

(b1) means for wavelength demultiplexing, by wavelength demultiplexing means, the optical signals constituted by the wavelength-multiplexed wavelength of the intra-device frame signal and wavelength of the clock signal transmitted through said optical switch, converting these two demultiplexed optical signals to electric signals and outputting them as an intra-device frame signal and a second clock signal, respectively;

(b2) means for sensing starting position of the data field by sensing the flag pattern in said intra-device frame signal, and performing control in such a manner that the packet data contained in the data field is written to a storage device in sync with the demultiplexed second clock signal; and (b3) means for reading the packet data out of said storage means in response to a third clock synchronized to the master frame signal and outputting the packet data to a transmit circuit in order to output the packet data to a transmission line.

10. An optical packet switch having an optical switch which performs packet switching, an input unit and an output unit, a master frame signal, which specifies length of a reference frame period within said optical packet switch, being output from master frame generating means and input to said optical switch, said input unit and said output unit, said optical switch switching a connection between said input and output units based upon the master frame signal;

(a) said input unit including:

(a1) an input signal receiver designed to receive an input signal from a transmission line, extracting packet data in a payload of a frame, to bit-synchronize the extracted payload data to a first clock signal generated using the master frame signal as a reference, to generate and output an intra-device frame signal having a preamble having a predetermined length, a flag pattern, a data field following the flag pattern and containing the packet data, and a dummy pattern, and to output the first clock signal;

(a2) first and second electro-optic transducers converting the intra-device frame signal and the first clock signal, which are input thereto, to an optical signal having a wavelength of an intra-device frame signal and an optical signal having a wavelength of a clock signal, and outputting the optical signals, said wavelengths being different from each other; and (a3) wavelength multiplexers, to which are input the wavelength of the intra-device frame signal and the wavelength of the clock signal constituting the optical signals output from respective ones of said first and second electro-optic transducers, designed to wavelength-multiplex these wavelengths and output them to said optical switch;

(b) said output unit including:

(b1) wavelength demultiplexers, to which the optical signals from an optical transmission path of said optical switch are input, for wavelength demultiplexing these optical signals to the wavelength of the intra-device frame signal and the wavelength of the clock signal;

(b2) first and second optoelectronic transducers, to which the wavelength of the intra-device frame signal and the wavelength of the clock signal demultiplexed and output by said wavelength demultiplexers are respectively input, for converting the same to an electric intra-device frame signal and an electric second clock signal, respectively;

(b3) an intra-device frame terminator having:

(b3-1) means for receiving the intra-device frame signal and the second clock signal respectively output from said first and second optoelectronic transducers, and sensing starting position of the data field by sensing a match with the flag pattern from said intra-device frame in sync with the second clock signal;

(b3-2) means for performing control in such a manner that when the starting position of the data field is sensed from the intra-device frame signal, the packet data from the starting position of the data field to an end position thereof is written to a memory in sync with the second clock signal, said second clock signal serving as a write signal; and (b3-3) means for reading the packet data out of said memory in sync with a third clock generated using the master frame signal as a reference, said third clock serving as a read-out signal; and (c) transmit means for transmitting the packet data from said intra-device frame terminator.

11. The optical packet switch according to claim 10, wherein said intra-device frame terminator includes:

flag pattern sensing means for sensing the flag pattern of the intra-device frame signal;

memory means for storing the pattern data temporarily;

write control means, responsive to a signal from said flag pattern sensing means indicating that the flag pattern has been sensed, for applying a write-enable signal to said memory means, wherein the packet data in the data field following the flag pattern in said intra-device frame signal is written to said memory means in sync with the second clock signal;

read-out control means, responsive to a read-out start signal output from said write control means after a predetermined number of bits have been written to said memory means, for applying a read-out-enable signal to said memory means, whereby timing of start of read-out from said memory means is control led so that read-out is performed a predetermined number of bits after writing of the packet data to said memory means has started;

the packet data being read of said memory means in sync with the third clock signal;

clock synchronizing means, to which the master frame signal is input, for generating the third clock in sync with the master frame signal; and phase control means for controlling operation start timing of said flag-pattern sensing means, said write control means and said read-out control means based upon the third clock signal from said clock synchronizing means.

12. The optical power switch according to claim 11, wherein said phase control means receives the third clock signal, outputs first and second operation start signals, which are for enabling start of operation of said flag-pattern sensing means and write control means, respectively, at predetermined timings before start of the flag pattern and start of data field, respectively, of the intra-device frame signal, and outputs a third operation start signal, which is for enabling start of operation of said read-out control means, at a predetermined timing after output of the first and second operation start signals but before start of the data field.

13. The optical packet switch according to claim 11, wherein said write control means deactivates the write-enable signal, which is supplied to said memory means, during the interval of the dummy data in the intra-device frame signal.

* * * * *